United States Patent [19]

Jou

[11] Patent Number: 5,625,894
[45] Date of Patent: Apr. 29, 1997

[54] SWITCH FILTER HAVING SELECTIVELY INTERCONNECTED FILTER STAGES AND PORTS

[75] Inventor: Chewnpu Jou, Hsinchu, Taiwan

[73] Assignee: Industrial Technology Research Institute, Taiwan

[21] Appl. No.: 407,897

[22] Filed: Mar. 21, 1995

[51] Int. Cl.$^6$ .................................................. H04B 1/44
[52] U.S. Cl. .......................................... 455/78; 455/82
[58] Field of Search ............................... 455/78, 79, 80, 455/82, 83; 333/167, 168, 174, 101, 175, 103, 104, 126, 129, 132, 134, 202, 205, 207, 209; 381/100

[56] References Cited

U.S. PATENT DOCUMENTS

| | | |
|---|---|---|
| 4,939,485 | 7/1990 | Eisenberg ............................. 333/104 |
| 4,980,660 | 12/1990 | Nakamura et al. ..................... 333/101 |
| 5,109,205 | 4/1992 | Hart et al. ............................. 333/104 |
| 5,109,536 | 4/1992 | Kommrusch ........................... 333/202 |
| 5,386,203 | 1/1995 | Ishihara ................................. 455/82 |

Primary Examiner—Reinhard J. Eisenzopf
Assistant Examiner—Marsha D. Banks-Harold
Attorney, Agent, or Firm—Meltzer, Lippe, Goldstein, et al.

[57] ABSTRACT

A switch filter is disclosed wherein switches are incorporated into the filter and divide the filter into various half-filters. The switch filter includes parallel and series LC circuits, switches, two input ports and two output ports where the input and output ports can be selectively coupled to each other. The switches are diodes or FETs, for example, that are switched via the presence or absence of control signals, such as a logic high or a logic low.

20 Claims, 15 Drawing Sheets

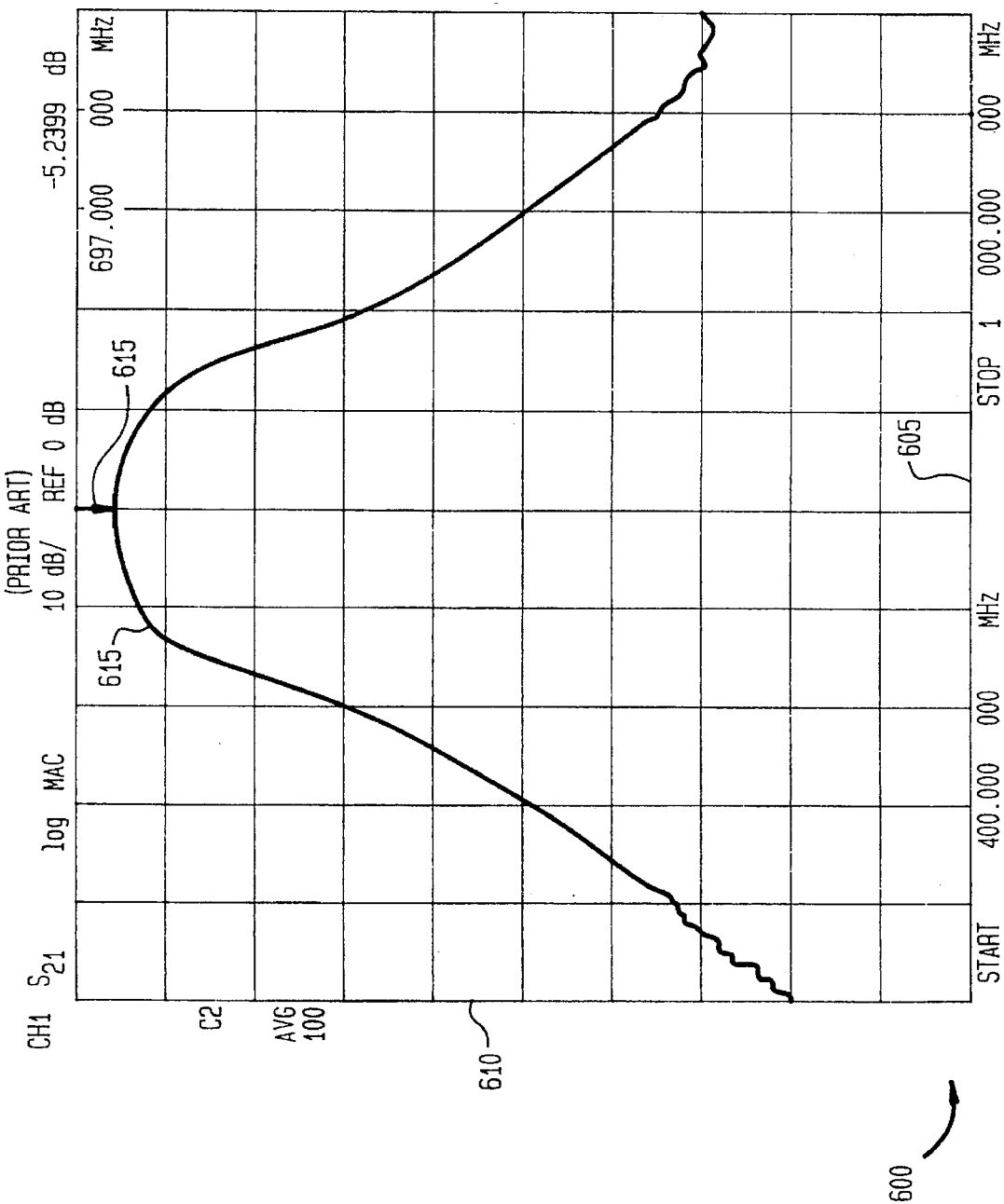

ID=5,625,894

SWITCH FILTER HAVING SELECTIVELY INTERCONNECTED FILTER STAGES AND PORTS

FIELD OF THE INVENTION

The present invention relates to a switch filter for switching among ports of the switch filter. In particular, the invention relates to a switch filter for switching among two antennas connected to a pair of ports located at one side of the switch filter and a receiver and a transmitter connected to another pair of ports located at another side of the switch filter.

BACKGROUND OF THE INVENTION

In radio frequency (RF) transmission systems, filters and switches are commonly used. Filters are used to filter out signals having unwanted frequencies and only allow signals in a desired frequency range to pass through with a minimum of attenuation. Switches at the input and output ports of the filter are used to effect coupling amongst, for example, a transmitter, receiver and antennas of a system.

Various type of filters are used, such as high pass filters, low pass filters, band stop filters and band pass filters. Normally a band pass filter is used between antennas and a transmitter or a receiver of a system so that only signals in a desired band of frequencies passes through the filter. A typical input-output amplitude relationship 100 of a band-pass filter is shown in FIG. 1, where the horizontal axis 105 represents frequency and the vertical axis 110 represents the amplitude response H(f) of the filter.

As shown in FIG. 1, the bandpass filter having the input-output amplitude relationship 100 has a passband between cut-off frequencies $f_1$ 115 and $f_2$ 120 and centered around a center frequency $f_c$ 125. The difference between $f_1$ 115 and $f_2$ 120 is often referred to as the bandwidth of the filter. The center frequency $f_c$ 125 is the frequency of operation of the system and is often referred to as the resonant frequency $f_0$ which is given by equation (1).

$$f_0 = \frac{\omega_0}{2\pi} \tag{1}$$

The resonant frequency is defined as that frequency at which the inductance resonates with the capacitance. This occurs when the inductive and capacitive reactances $\omega L$, $1/\omega C$ are equal in magnitude, or $$\omega_0 L = \frac{1}{\omega_0 C} \tag{2}$$

$$\omega_0^2 = \frac{1}{LC} \tag{3}$$

$$\omega_0 = \sqrt{\frac{1}{LC}} \tag{4}$$

A Quality factor Q is often associated with resonant circuits which defines the roll-off rate of the response curve 100 which often results in a higher amplitude at the center frequency $f_c$ 125 and a narrower bandwidth. The Quality factor Q is a function of the energy stored in the inductor and capacitor of a resonant circuit and the energy lost in the resistor. For example, the series LC circuit 200 shown in FIG. 2a has a Q defined by equation (5)

$$Q = \frac{1}{R}\sqrt{\frac{L}{C}} \tag{5}$$

Similarly, the LC parallel circuit 250 shown in FIG. 2b has a Q defined by equation (6)

$$Q = R\sqrt{\frac{C}{L}} \tag{6}$$

To reduce the attenuation of desired signals passing through the filter, a matched filter is often used, particularly in radar and digital data systems. The matched filter is designed to have nearly the same transfer characteristic as the source of the inputted signal. Ideally, the signal output by the matched filter is the same as the inputted signal (except for the total absence of the portions of the inputted signal which were filtered out) and is merely delayed in time by $t_0$. The amplitude of the input signal having frequencies in the passband remains relatively unchanged as the input signal goes through the filter whereas, for frequencies outside the passband, the amplitude is entirely attenuated by the filter.

The matched filter is designed to have an impedance at its ports which matches the impedance of the subsystems attached to the filter's ports. Impedance or admittance transformer circuits are used to convert the input/output impedances or admittances of the filter to a desired value. The desired value of the input/output impedance or admittance of a matched filter is the complex conjugate of the impedance or admittance of the external circuits connected to the filter.

Basically, a filter can be considered as a combination of n number of resonators (e.g., reactive element 310, 360) and n−1 number of impedance or admittance transformers 305, 355 as shown in FIGS. 3a and 3b.

FIG. 3a shows a generalized band-pass filter circuit 300 having 1 to n stages. Each stage of the band-pass filter circuit 300 has an impedance transformer 305 connected to a reactive element 310. The impedance transformers 305 are designed to convert the input impedance Zin 315 of the filter 300 to match the input resistor $R_A$ 320. The input resistor $R_A$ 320 is the impedance of a purely resistive system connected to the input of the filter 300. Illustratively, the impedance of a system connected to the input of the filter 300 has a value of 50 Ω.

Instead of a purely resistive system having the input resistor $R_A$ 320, the system connected to the band-pass filter circuit 300 may have a complex impedance $Z_A$. A filter designed to match such a system, will have an input impedance Zin 315 equaling $Z_A^*$ which is the complex conjugate of input system's impedance $Z_A$. The input impedance Zin 315 is the impedance looking into the input terminals 325 of the filter 300. Similarly, the output impedance $Z_{out}$ 330 is the impedance looking into the output terminals 335 of the filter 300. The impedance transformers 310 also convert the output impedance $Z_{out}$ 330 to match the output resistor $R_B$ 340 for systems connected to the output of the filter 300 having a purely resistive impedance. The impedances looking into each stage 1 to n may be different; therefore, a different impedance transformer 310 is illustratively used for each stage.

Similarly, FIG. 3b shows a generalized band-pass filter circuit 350 using admittance transformers 355 connected between reactive elements 360. The admittance transformers 355 convert the input and output admittances $G_{in}$ 365, $G_{out}$ 370 of the filter 350 to match the input and output conductances $G_A$ 375, $G_B$ 380 respectively. As discussed above in connection with impedance transformers, for a system connected to the input of the filter 300 having a complex admittance $Y_A$, the admittance of a matched filter 350 is $Y_A^*$ which is the complex conjugate of input system's admittance $Y_A$.

At the resonant frequency, the converted input/output impedances $Z_{in}$ 315, $Z_{out}$ 330 or admittances $G_{in}$ 365, $G_{out}$ 370, match the input/output resistors $R_A$ 320, $R_B$ 340 or conductances $G_A$ 375, $G_B$ 380. Such matching provides for a maximum power transfer between the input and output of the filter and produces a minimum distortion in the signal passing through the bandpass filters 300, 350.

In the passband, for example at the resonant frequency ($f_0$ or $\omega=\omega_0$), the impedance of the reactive elements 310 have a small susceptance value (i.e., nearly a short circuit) and the signal passes through the filter 300 with a minimum distortion. Similarly, in the passband, the admittance of the reactive elements 360 have a large susceptance value at resonance (i.e., nearly an open circuit) and very little of the input signal is shunted therethrough. Instead, the input signal passes through the filter with a minimum attenuation. Similar to the input and output impedances of FIG. 3a, the input and output admittances of each stage 1 to n of FIG. 3b are different requiring different admittances transformers 355 for each stage.

FIG. 4 shows a symmetric nine stage filter 400, having an impedance $Z_0(f)$ 405 looking into the terminals 410 of the first stage 415 which is the same as the impedance looking into the terminals 420 of the ninth stage 425. The impedance $Z_1(f)$ 430 looking into the terminals 435 of the third stage 440 is equal to the impedance looking into the terminals 445 of the seventh stage 450. Similarly, the value of the impedances looking into the terminals 455 and 460 of the fifth stage 465 are the same and equal to $Z_2(f)$ 470.

FIG. 5 shows a two port bandpass filter 500 comprising a five stage lumped bandpass filter. The two port bandpass filter 500 has two series LC filters 502 and 504 (which are the second and fourth stages respectively) and three parallel LC filters 506, 508 and 510 (which are the first, third and fifth stages respectively). The first port 512 is connected to a node 514 which is connected to the series LC filter 502 and the parallel LC filter 506. The parallel LC filter 506 has a capacitor $C_5$ 516 having a first terminal 518 connected to the node 514 and a first terminal 520 of a inductor $L_5$ 522. A second terminal 524 of the capacitor $C_5$ 516 and a second terminal 526 of the inductor $L_5$ 522 are grounded.

The node 514 is also connected to a first terminal 528 of an inductor $L_4$ 530. A second terminal 532 of the inductor $L_4$ 530 is connected to a first terminal 534 of a capacitor $C_4$ 536. A second terminal 538 of the capacitor $C_4$ 536 is connected to a node 540.

A parallel LC filter and a series LC filter are connected to node 540 in a similar fashion as the connection to node 514. That is, a capacitor $C_3$ 542 and an inductor $L_3$ 544 are connected in parallel, with one side 546 connected to the node 540 and another side 548 connected to ground.

An inductor $L_2$ 550 is connected in to a capacitor $C_2$ 552 to form the series LC filter 504. One side 554 of the series LC filter 504 is connected to the node 540 and another side 556 is connected to a node 558. Also connected to the node 558 is the second port 560 and the parallel LC filter 510. The parallel LC filter 510 is formed by a capacitor $C_1$ 562 and an inductor $L_1$ 564.

The frequency response 600 of the filter 500 is shown in FIG. 6, where the value of the components of the filter 500 are as follows:

| | | |
|---|---|---|
| $L_1$ = | $L_5$ = | 2.1 nH |
| $C_1$ = | $C_5$ = | 18 pF |
| $L_2$ = | $L_4$ = | 33 nH |
| $C_2$ = | $C_4$ = | 1.2 pF |
| | $L_3$ = | 1.5 nH |
| | $C_3$ = | 27 pF |

The horizontal axis 605 shown in FIG. 6 represents frequency from 450 MHz to 950 MHz in increments of 50 MHz. The vertical axis 610 represents magnitude of the output of the filter 500 of FIG. 5 in response to an input signal having a 0 dB amplitude from 450 MHz to 950 MHz. The vertical axis 610 is in 10 dB increments starting from 0 db at the top and going down to −100 dB. The center frequency, where an arrow 615 is pointing, is 697 MHz and the magnitude of the frequency response 600 is −5.2399 db.

Switches are often connected to the input and output ports of a filter to selectively interconnect the filter ports. In RF transmission systems, for example, switches are connected to filter ports to selectively interconnect the transmitter, receiver and antenna of the system. U.S. Pat. Nos. 4,701, 724, 4,803,447 and 5,023,935 disclose such a combination of a filter connected externally to switches. The '724 and '935 patents disclose a first and second coupled quarter-wave transmission lines, acting as bandpass filter, and switches or diodes externally connected to the bandpass filter.

In all three patents '724, '447 and '935, a first series PIN (p-type, intrinsic silicon, n-type) diode switch element is connected to an input terminal of the filter and a second PIN diode switch shown is connected in parallel to another terminal of the filter. Because there is no impedance transformers to convert the impedance of these PIN diodes to a high impedance, the insertion loss contributed by these diodes is large. In addition, the second PIN diode switch shown in the three patents are connected in parallel to one of the ports of the filter. In all three patents '724, '447 and '935, the filters are independent modules similar to a block diagram 700 shown in FIG. 7a. That is, these filters are designed independently from the switches, and later integrated with the PIN diode switches. Furthermore, the filters disclosed in patents '724 and '447 are narrow band filters tuned to a single frequency.

FIG. 7a shows a block diagram 700 of a transceiver having a filter and switches similar to the ones disclosed in '724 and '935. More particularly, instead of a single antenna used in analog radio systems, two antennas are used in a digital radio system as shown in FIG. 7a. The block diagram 700 of FIG. 7a has become a standard module in an ever more popular TDMA (Time Division Multiple Access) digital wireless communication systems. The block diagram 700 used in digital radio systems has two separate single pole double throw (SPDT) switches 705, 710 and a bandpass filter 715.

The block diagram 700 has four ports which are the ports of the two SPDT switches 705, 710. A first port 720 is connected to a receiver 725 while a second port 730 is connected to a transmitter 735. The third and fourth ports 740, 745 are connected to a first and a second antenna 750, 755 respectively. The bandpass filter 715 is connected between a center terminal 760 of the first SPDT switch 705 and a center terminal 765 of the second SPDT switch 710. The two SPDT switches 705, 710 interconnect the two antennas 750, 755 to the receiver 725 and the transmitter 735 through the bandpass filter 715.

In the default condition, shown in FIG. 7a, the first antenna 750 is connected to the receiver 725. The two antennas 750, 755, the receiver 725 and the transmitter 735 can be connected in any combination by switching the two switches 705, 710.

For a system having an impedance of $Z_0$, the impedance of a matched filter should also be $Z_0$. Thus, the impedance looking into the filter 715 is $Z_0$ as is the impedance looking into the systems connected to the switches 705, 710.

The block diagram 700 of the digital radio system is commonly used in communication systems, modems and cellular telephones. Having the two independent SPDT switches 705, 710 connected to the bandpass filter 715 contributes to losses in the system. These additional losses results in a high loss system which pose stringent restraints and requirement in the design of the receiver, transmitter and antennas connected to the switches 705, 710 and the filter 715.

FIG. 7b shows a small signal model of the dotted portion 760 of the block diagram 700 of FIG. 7a. The switch 705 of FIG. 7a is represented by its small signal resistance r 765. The resistance r 765 is connected between two impedances $Z_0$ 770 representing the impedances of the receiver 725 and filter 715 connected to the switch 705.

The amplitude in dB of the theoretical loss of each of the two SPDT switches 705, 710 of FIG. 7a is given by equation (7) below:

$$\alpha_0 = 20 \log(1 + e, \text{fra } g_F/2 + ee) \, dB \quad (7)$$

where, $$g_F = {}^{ti} r/Z + hd \, 0 \quad (8)$$

where $Z_0$ is the impedance of the system and has a value of 50 Ω, and r is the small-signal resistance of the switch 705.

The block diagram 700 can be implemented by using the filter 500 shown in FIG. 5 as the bandpass filter 715 of FIG. 7a. The two SPDT switches 705, 710 can be implemented by using PIN diodes. Illustratively, an HSMP-3890 PIN diode made by Hewlet Packard can be used. The HSMP-3890 PIN diode is biased with approximately a 5 mA bias current and has a dynamic resistance of approximately 5 Ω. Based on experimental measurements and according the equation (7), the loss per conducting PIN diode is found to be at least 0.4 dB. Because there are two SPDT switch, two PIN diodes conduct at any one time. Therefore, using PIN diodes and the filter 500 of FIG. 5 to implement the block diagram 700 having the two SPDT switches 605, 610 results in a filter that has a loss of at least 0.8 dB due to the two SPDT switches. This 0.8 dB loss is in addition to the 5.2399 dB loss of the filter 500 (FIG. 5) at 697 MHz as shown in the amplitude response of FIG. 6.

Such losses cause the system 700 to suffer from a low efficiency, as half of the transmit or receive power may be lost. Losses of power closer to the antenna are more significant causing fading of the received signal. In addition, such losses reduce the power of the signal transmitted from the antenna to inadequate levels. Such losses are particularly significant for battery operated portable machines, such as cellular telephones and personal communicators, where the excess power required to compensate for the losses discharges the battery quickly.

To compensate for the losses, not only a larger battery is needed, but also larger components may be needed, such as larger transmitters and antennas. The additional size and weight are undesirable and a serious drawback to portable equipment, where the trend is to miniaturize as much as possible. In addition, highly complex and costly circuitry may be needed in the receiver and/or the transmitter, such as low noise high gain amplifiers and high sensitivity receivers.

It is therefore an object of the present invention to provide a switch filter which overcomes the disadvantages of the prior art. It is another object of the present invention to provide a multi-port switch filter which provides filtering and switching, operates efficiently, consumes less power and has a low insertion loss. It is a further object of the present invention to reduce the size of the switch filter.

SUMMARY OF THE INVENTION

The present invention achieves this and other objects by providing a switch filter that has switches built into the filter. In response to control signals, the switches are selectively activated to interconnect desired ports of the switch filter.

In one embodiment of the present invention, the switch filter has four filter stages and four ports wherein each port is connected to a filter stage. Four diodes, each connected to its own biasing signal, act as switches that interconnect the four filter stages. In response to the biasing signals, the diodes turn on to selectively interconnect the four ports of the switch filter.

Illustratively, each filter stage comprises a parallel LC circuit connected to a series LC circuit. The parallel LC circuit is connected to a port of the switch filter and the series LC circuit is connected in series between the parallel LC circuit and an anode of one of the diodes. The anode of each diode is also connected to its own resistor which provides a control signal that biases the diode for switching it on and off. All the cathodes of the four diodes are connected together and connected to a parallel LC circuit. One terminal of all the parallel LC circuits are grounded.

In another embodiment of the present invention, the switches are field effect transistors (FETs) instead of diodes. An RF choke is connected to the drain of each FET. In yet another embodiment, each filter stage is a quarter-wave transmission line section and a capacitor is connected to the cathode of each diode. The anodes of the diodes are connected to a signal path between the ports formed by serially connected quarter-wave transmission line sections. Each terminal of the serially connected quarter-wave transmission line sections is connected to a ground through a corresponding quarter-wave transmission line section.

Illustratively, one port of the switch filter is connected to a receiver and a second port connected to a transmitter. The third and fourth ports are connected to a first antenna and a second antenna respectively. Depending on biasing of the four diodes of the switch filter, the receiver can be connected to either the first or the second antenna. Similarly, the transmitter can be connected to either the first or the second antenna.

The switch filter has a lower insertion loss than a filter externally connected to switches. Therefore, it operated more efficiently, requiring less power. The reduced power consumption and low insertion loss provides for a long battery life. In addition, simpler and less expensive external circuitry can be connected to the switch filter, such as simple receivers and transmitters, instead of complex low noise receivers with high sensitivity or low noise high power transmitters. Furthermore, antennas with lower gains can be used and the system using the switch filter can still perform adequately.

BRIEF DESCRIPTION OF THE DRAWING

FIG. 6 illustrates the amplitude response of the two port bandpass filter of FIG. 5.

FIG. 7b depicts a small-signal model of a portion of the block diagram shown in FIG 7a.

FIG. 10a depicts a block diagram of the switch filter shown in FIG. 9a.

FIG. 10b depicts a small-signal model of the block diagram shown in FIG. 10a.

FIG. 11 illustrates the amplitude response of the embodiment of the switch filter shown in FIG. 9a.

DETAILED DESCRIPTION OF THE INVENTION

Figure 4:
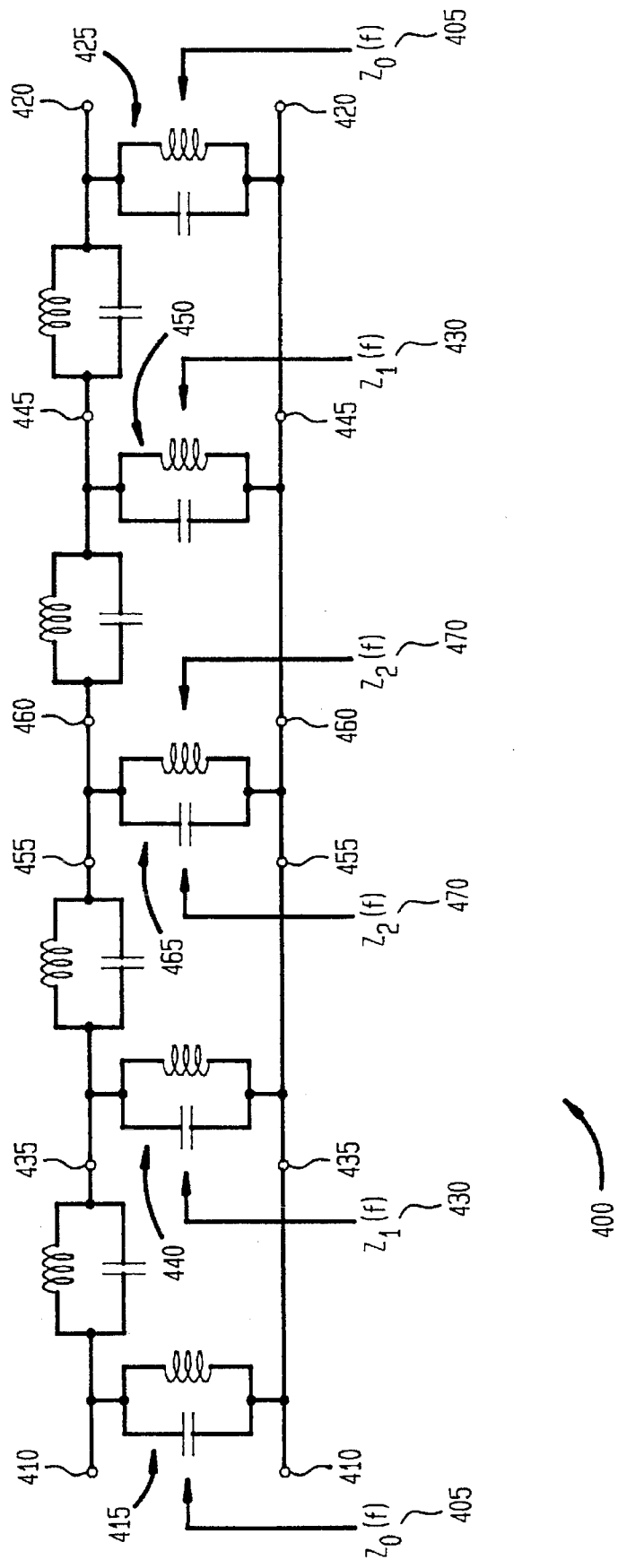
FIG. 4 depicts a symmetric four stage bandpass filter.
Figure 8:
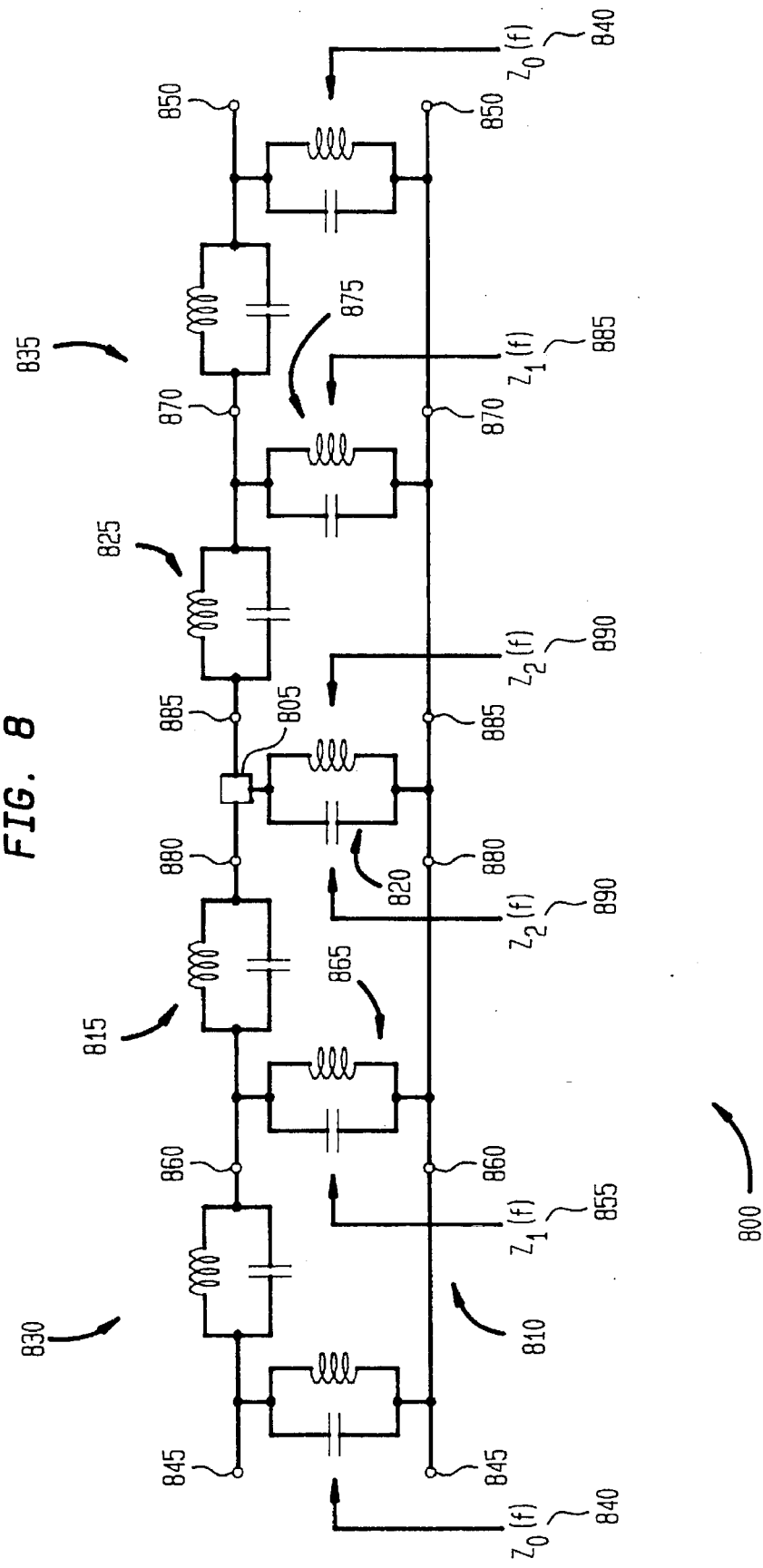
FIG. 8 depicts one embodiment of a switch filter according to the present invention.

FIG. 8 shows one embodiment of a switch filter 800 according to the present invention which incorporates a switch 805 into a filter 810 which is a nine stage symmetric filter, similar to the filter 400 shown in FIG. 4. The switch 805 is integrated internally to the nine stage filter 800. The switch 805 is located in the middle of the filter 800 and is connected between the fourth 815, fifth 820 and sixth 825 stages. That is, the switch 805 connects the two half-filters 830, 835. A half-filter refers to the portion of a filter from the first stage to the n/2 stage in an n stage filter.

Similar to the filter 400 shown in FIG. 4, the switch filter 800 is a symmetric nine stage filter having an impedance $Z_0(f)$ 840 looking into the input terminals 845 and the output terminals 850. The impedance $Z_1(f)$ 855 looking into the terminals 860 of the third stage 865 is equal to the impedance looking into the terminals 870 of the seventh stage 875. Similarly, the value of the impedances looking into the terminals 880 and 885 of the fifth stage 820 are the same and equal to $Z_2(f)$ 890.

Figure 9A:
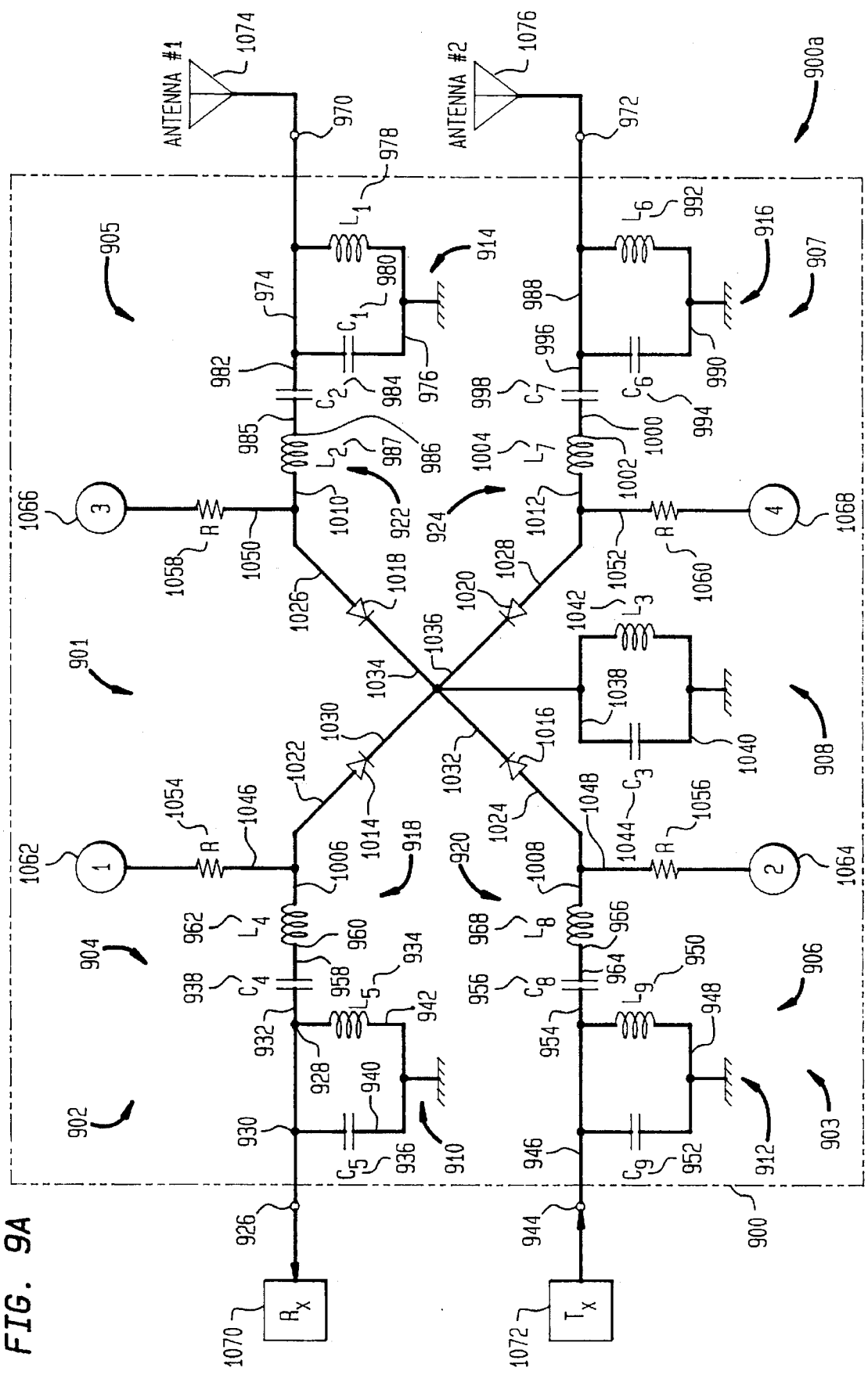
FIGS. 9a–9d depict another embodiment of a switch filter according to the present invention.
Figure 9B:
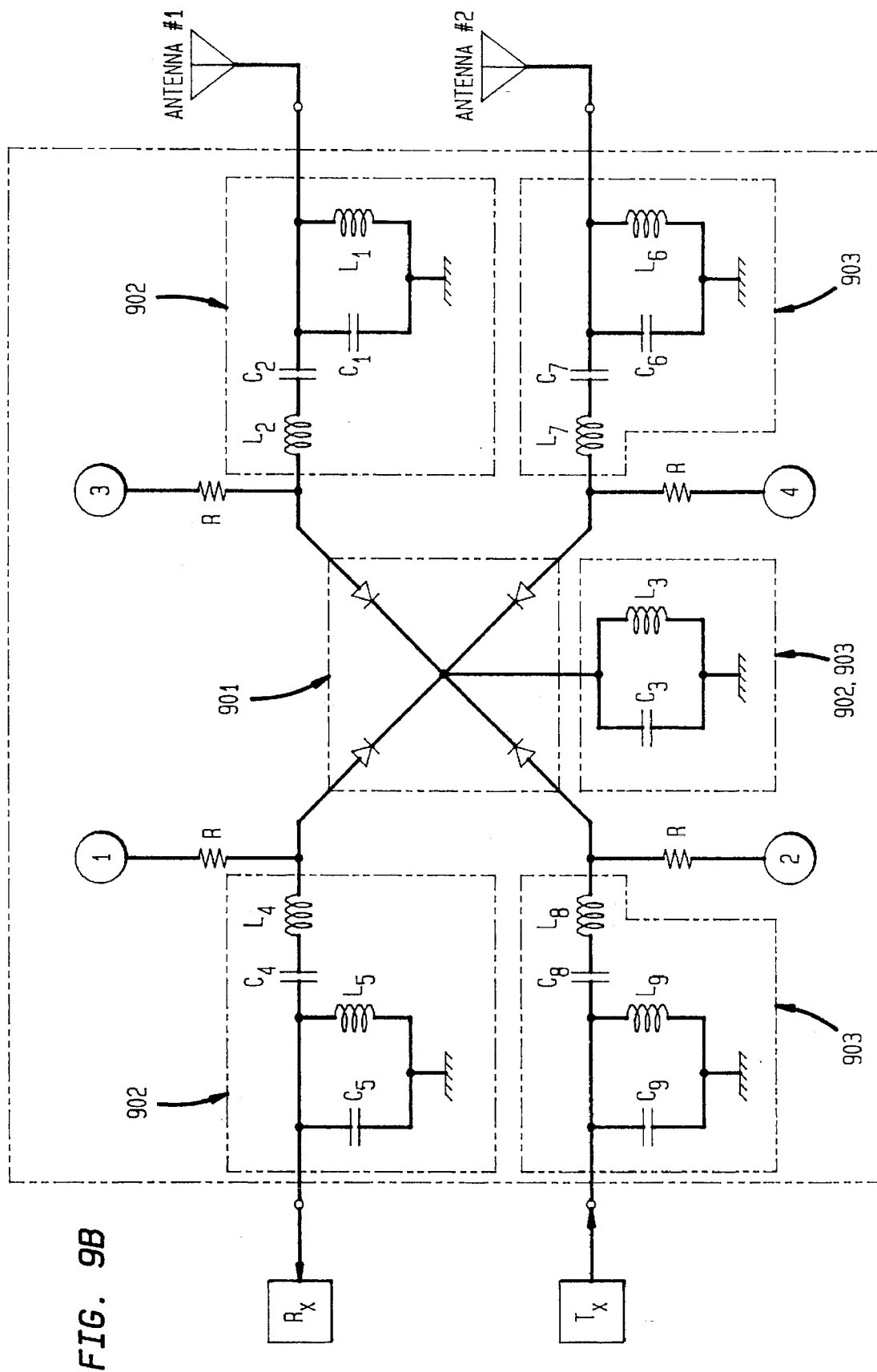
Figure 9C:
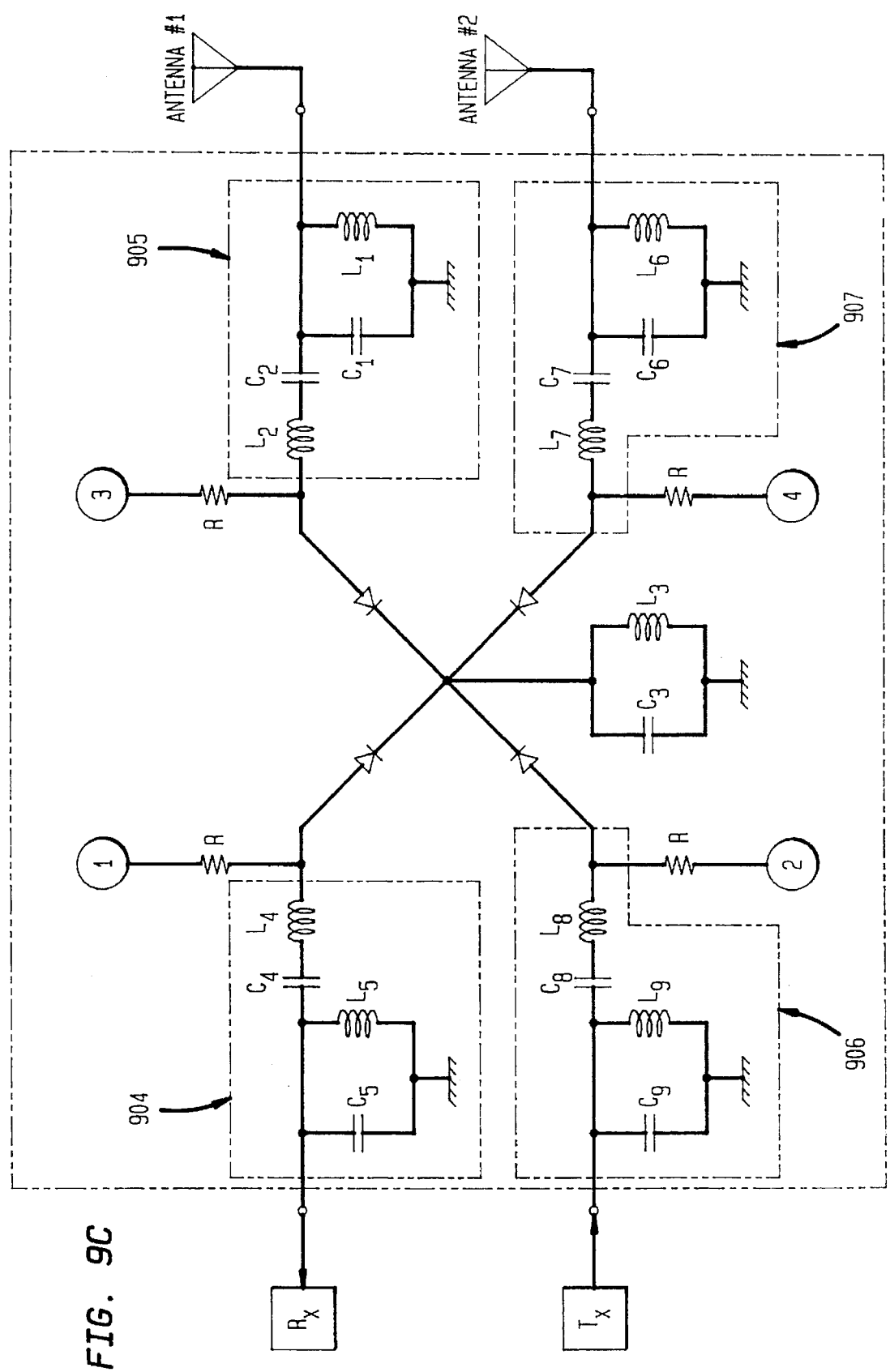

FIG. 9a shows another embodiment of a switch filter 900 according to the present invention incorporated into a transceiver 900a. The switch filter 900 is a four port switch filter which incorporates a switch 901 (shown in dotted lines in FIG. 9b) into a pair of the two port five stage bandpass filters 902, 903 (shown in dotted lines in FIG 9b). The two port five stage bandpass filter 902 comprises two half-filters 904, 905 and the filter 903 comprises two half- filters 906, 907 (shown in dotted lines in FIG. 9c).

Figure 5:
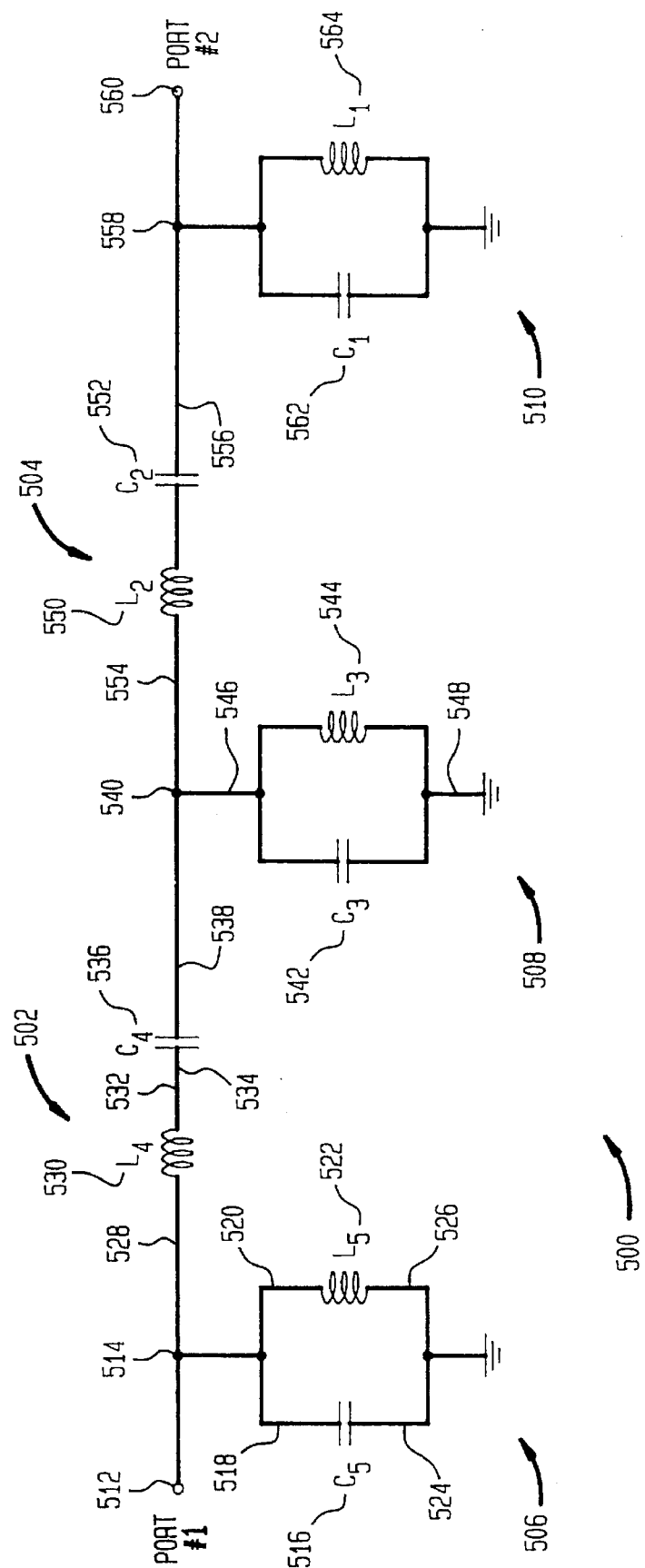
FIG. 5 depicts a two port bandpass filter.
Figure 9D:
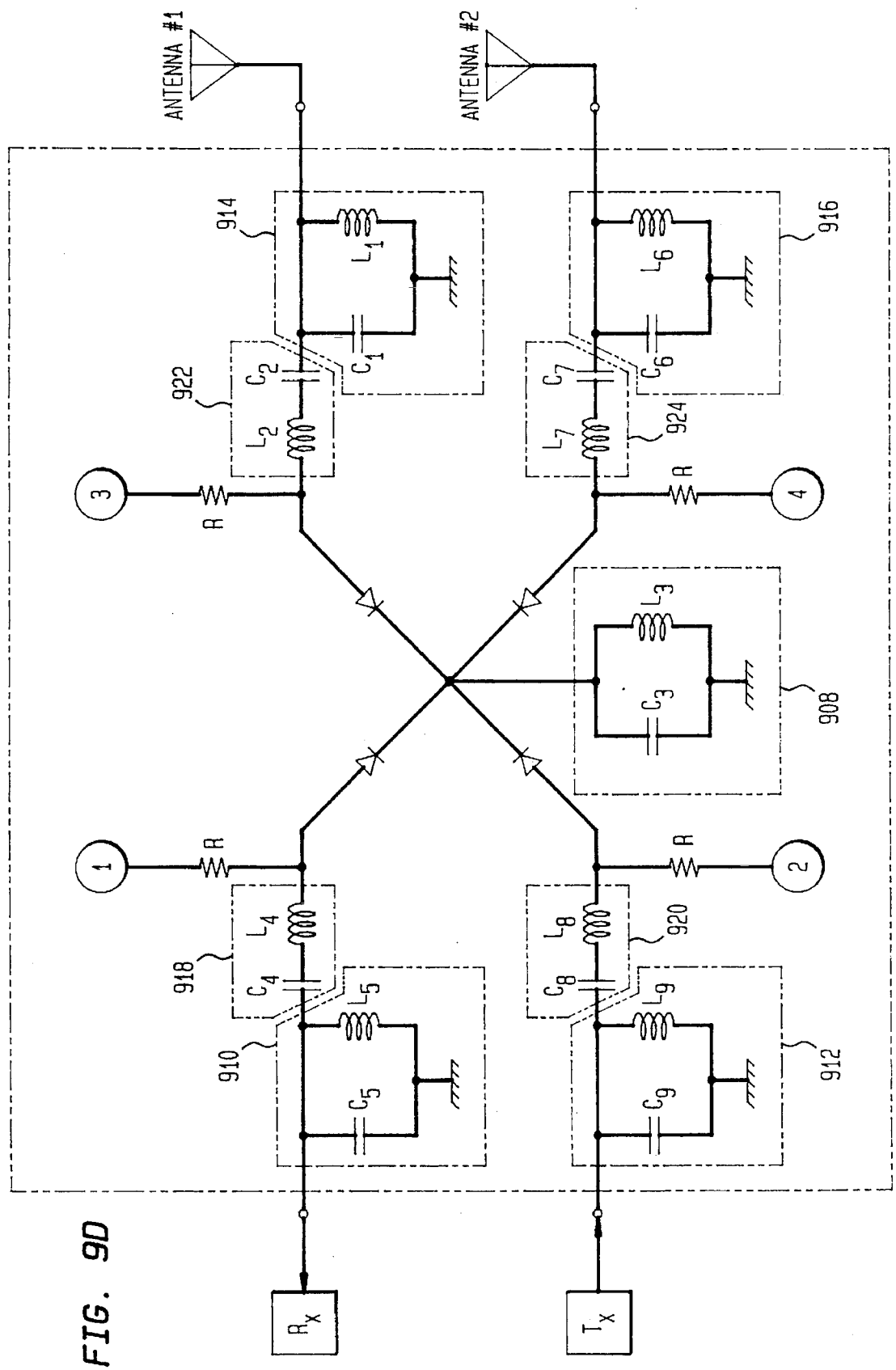

Each of the two five stage filters 902, 903 is similar to the five stage filter 500 depicted in FIG. 5. The two five stage filters 902, 903 share a common third stage 908 and are connected together via the switch 901. As shown in dotted lines in FIG. 9d, the third stage 908 is a parallel LC filter. Two additional parallel LC filters 910, 912 and 914, 916 form the first and fifth stages of each of the two five stage filters 902, 903 respectively. The second and fourth stages 918, 920 and 922, 924 are series LC filters.

A first port 926 of the switch filter 900 is connected to a first terminal 928, 930 and 932 of an inductor $L_5$ 934 and capacitors $C_5$, $C_4$ 936, 938 respectively. The inductor $L_5$ 934 and capacitor $C_5$ 936 are connected in parallel and form the first stage 910 of the first five stage bandpass filter 902. A second terminal 940 of the capacitor $C_5$ 936 and a second terminal 942 of the inductor $L_5$ 934 are grounded.

In a similar fashion, a second port 944 of the switch filter 900 is connected to a first terminal 946 of the first stage 912 of the second five stage bandpass filter 903. A second terminal 948 of the first stage 912 is grounded. The first stage 912 is a parallel connection of an inductor $L_9$ 950 and capacitor $C_9$ 952. The first terminal 946 of the first stage 912 is also connected to a first terminal 954 of a capacitor $C_8$ 956.

The capacitors $C_4$ 938 of the second stages 918 of the first five stage bandpass filters 902 has a second terminal 958 which is connected in series to a first terminal 960 of an inductor $L_4$ 962. Similarly, the capacitors $C_8$ 956 of the second stages 920 of the second five stage bandpass filters 903 has a second terminal 964 which is connected in series to a first terminal 966 of an inductor $L_8$ 968.

A third and a fourth port 970, 972 of the switch filter 900 are connected in a similar fashion as the first and second ports 926, 944. That is, the third port 970 is connected to a first terminal 974 of the fifth stage 914. A second terminal 976 of the fifth stage 914 is grounded. The fifth stage 914 has an inductor $L_1$ 978 and a capacitor $C_1$ 980 which are connected in parallel.

The first terminal 974 of the fifth stage 914 is also connected to a first terminal 982 of a capacitor $C_2$ 984. A second terminal 985 of the capacitor $C_2$ 984 is connected in series to a first terminal 986 of an inductor $L_2$ 987.

The fourth port 972 of the switch filter 900 is connected to a first terminal 988 of the fifth stage 916 of the second five stage bandpass filters 903. A second terminal 990 of the fifth stage 916 is grounded. The fifth stage 916 has an inductor $L_6$ 992 and a capacitor $C_6$ 994 which are connected in parallel.

The first terminal 988 of the fifth stage 916 is also connected to a first terminal 996 of a capacitor $C_7$ 998. A second terminal 1000 of the capacitor $C_7$ 998 is connected in series to a first terminal 1002 of an inductor $L_7$ 1004.

Second terminals 1006, 1008, 1010, 1012 of the inductor $L_4$ 962, $L_8$ 968, $L_2$ 987 and $L_7$ 1004 are connected to the switch 901. Illustratively, the switch 901 comprises four diodes 1014, 1016, 1018, 1020 which may be PIN diodes. The anodes 1022, 1024, 1026, 1028 of the four diodes 1014, 1016, 1018, 1020 are respectively connected to the second terminals 1006, 1008, 1010, 1012 of the inductor $L_4$ 962, $L_8$ 968, $L_2$ 987 and $L_7$ 1004.

All the cathodes 1030, 1032, 1034, 1036 of the four diodes 1014, 1016, 1018, 1020 are connected together and to a first terminal 1038 of the common third stage 908 shared by the first and second five stage filters 902, 903. A second terminal 1040 of the common third stage 908 is grounded. The common third stage 908 is an inductor $L_3$ 1042 and a capacitor $C_3$ 1044 connected in parallel.

In addition, each of the anodes 1022, 1024, 1026, 1028 is respectively connected to a first terminal 1046, 1048, 1050, 1052 of its own resistor R 1054, 1056, 1058, 1060. In turn, a second terminal 1062, 1064, 1066, 1068 of each of the resistor R 1054, 1056, 1058, 1060 acts as a control port of the switch 901. The second terminals 1062, 1064, 1066, 1068 are respectively the control ports 1 to 4 of the switch 901. The control ports 1 to 4 1062, 1064, 1066, 1068 receive a control signal which selectively switches the diodes 1014, 1016, 1018, 1020 of the switch 901. This interconnects the ports 926, 944, 970, 972 of the switch filter 900.

The diodes receiving a control signal of zero volts remain off, while the diodes receiving a control signal having a certain voltage V turn on and conduct. Illustratively, the value of the voltage V is 5 volts. Illustratively, the ports 926, 944, 970, 972 of the switch filter 900 are respectively connected to a receiver Rx 1070, a transmitter Tx 1072, antenna #1 1074 and antenna #2 1076. The ports 926, 944, 970, 972 interconnect in response to the control signals applied to the controls ports 1 to 4 1062, 1064, 1066, 1068 in accordance with table 1.

TABLE 1

| Antenna | Tx/Rx | Control Port 1 | Control Port 2 | Control Port 3 | Control Port 4 |
|---|---|---|---|---|---|
| #1 | Tx | 0 | V | V | 0 |
| #1 | Rx | V | 0 | V | 0 |
| #2 | Tx | 0 | V | 0 | V |
| #2 | Rx | V | 0 | 0 | V |

That is, when the control port 2 1064 and the control port 3 1066 are high (e.g., 5 volts), and the control ports 1 and 4 1062, 1068 are low, then antenna #1 1074 is connected to the transmitter Tx 1072. Similarly, antenna #1 1074 is connected to the receiver Rx 1070 when control ports 1 and 3 1062, 1066 are high and control ports 2 and 4 1064, 1068 are low. Antenna #2 1076 may be connected to either the transmitter Tx 1072 or the receiver Rx 1070 depending on the control signals applied to the control ports 1–4 as shown in table 1.

Figure 1:
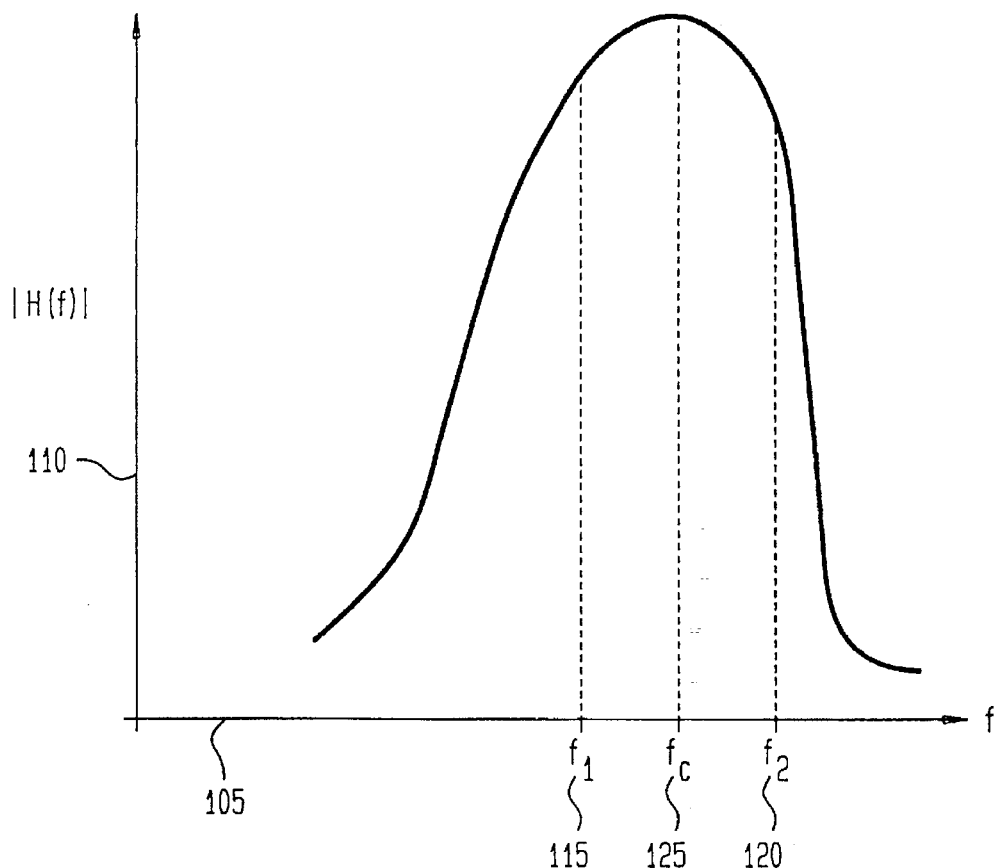
FIG. 1 illustrates a typical amplitude response of a bandpass filter.
Figure 2A:
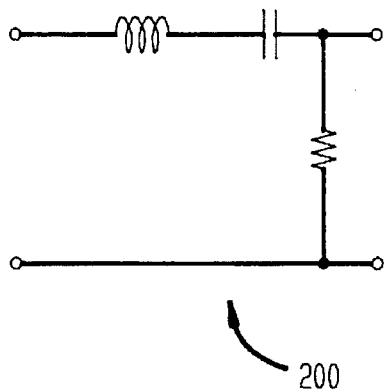
FIG. 2a depicts a series LC circuit.
Figure 2B:
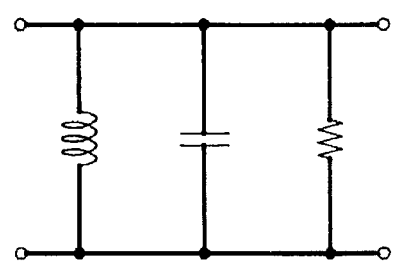
FIG. 2b depicts a parallel LC circuit.
Figure 3A:
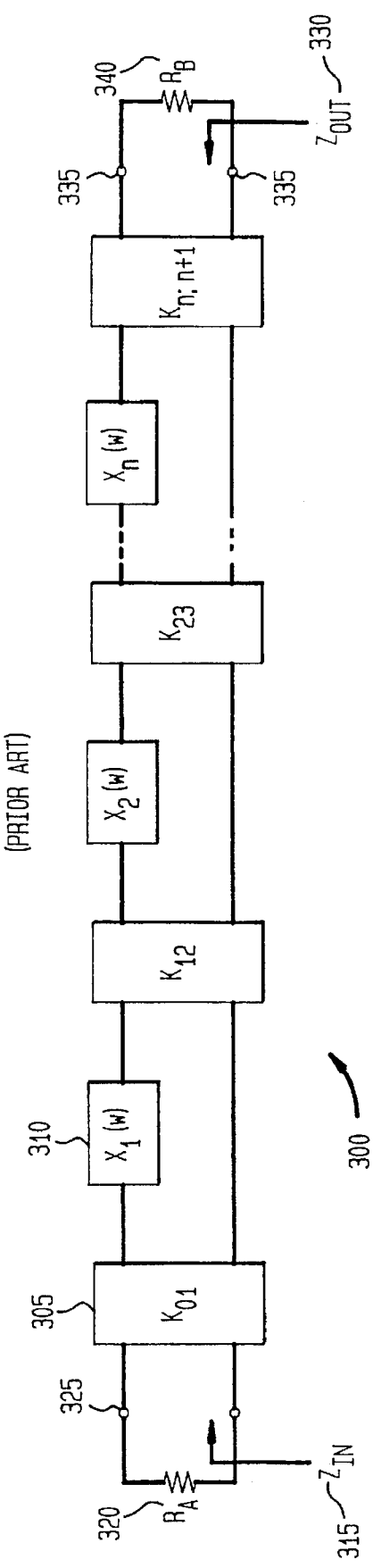
FIG. 3a depicts a generalized bandpass filter using impedance transformers.
Figure 3B:
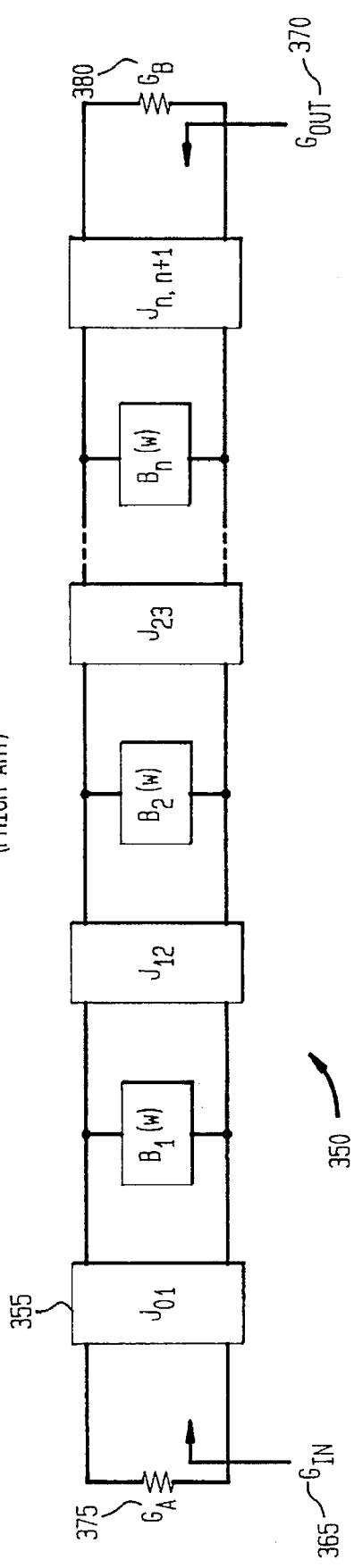
FIG. 3b depicts a generalized bandpass filter using admittance transformers.

As shown in FIGS. 3a and 4, a filter can be considered as a combination of n number of resonators (e.g., reactive element 310) and n+1 number of impedance transformers 305 which convert impedances. For example, the converted impedance $Z_0$ 405 in FIG. 4 represents the impedance looking into the terminals of the filter 400, which is a combination of all the converted impedances of the stages 1 to n of the filter 400.

Figure 10A:
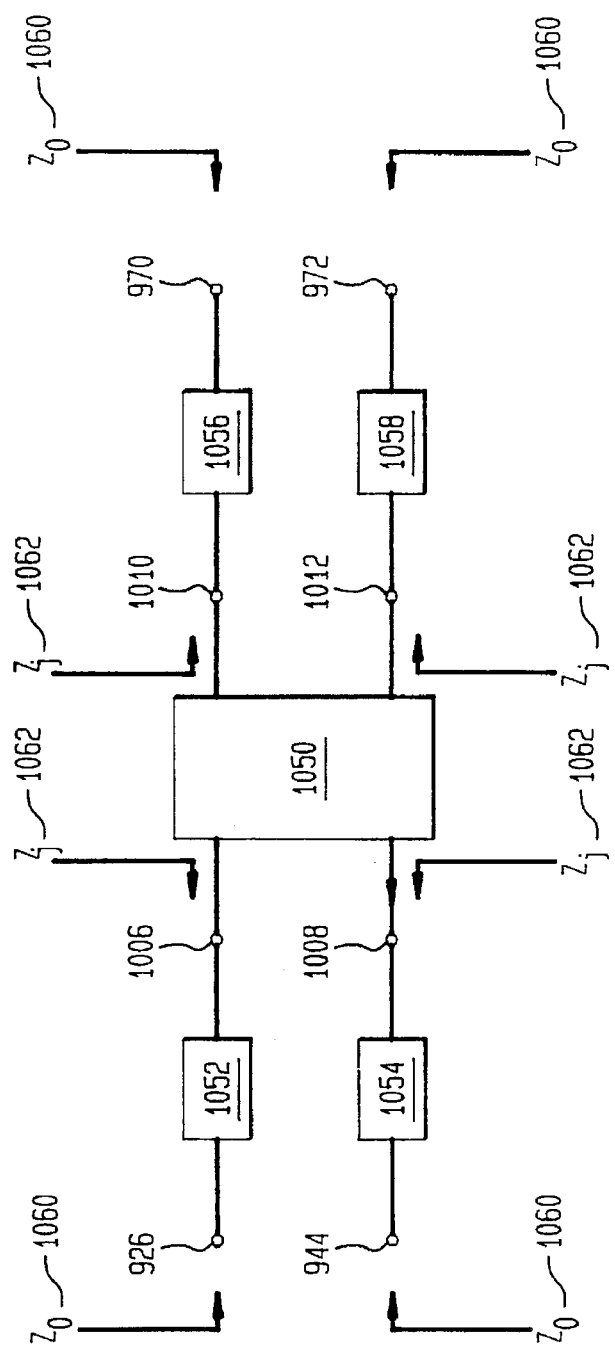

FIG. 10a shows a block diagram of the switch filter 900 shown in FIG. 9a. The switch 1050, representing the switch 901 of FIG. 9a, is connected between a first and second filters 1052, 1054 and a third and fourth filters 1056, 1058 which respectively represent the half-filters 904, 906, 905 and 907 of the pair of the two port five stage bandpass filters 902, 903 of FIG. 9a. That is, the switch 1050 is not connected to the outer ports 926, 944, 970, 972 but is connected internally within the filter between the half-filters 904, 906, 905 and 907.

The impedance looking into each of the four ports 926, 944, 970 and 972 (FIG. 9a, 10) is $Z_0$ 1060 (which is also the impedance of the systems to be connected to these ports, such as the receiver Rx 1070, the transmitter Tx 1072 and antennas 1074, 1076 of FIG 9a. That is, the switch filter is matched to the systems connected thereto).

Due to transformation of the impedances, as explained in connection with FIGS. 3a and 4, the impedance $Z_0$ 1060 is converted such that the impedance seen by the switch 1050 (901 of FIG. 9a) looking into the terminals 1006, 1008, 1010 and 1012 (FIGS. 9, 10) is $Z_j$ 1062 where $Z_j \gg Z_0$. The impedance $Z_j$ 1062 may also be referred to as the impedance of the $j_{th}$ stage where the $j_{th}$ stage is connected to the switch 1050.

Figure 7A:
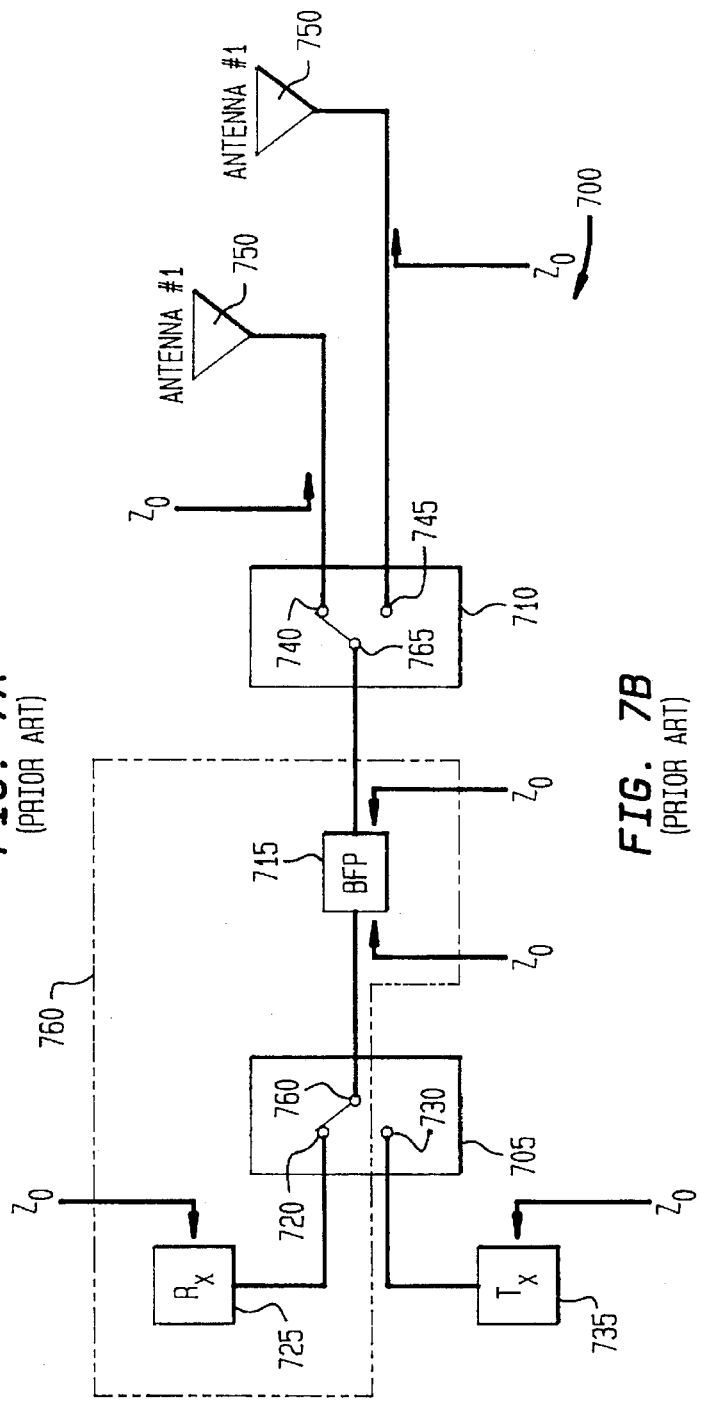
FIG. 7a depicts a block diagram of a bandpass filter connected between two switches.
Figure 7B:
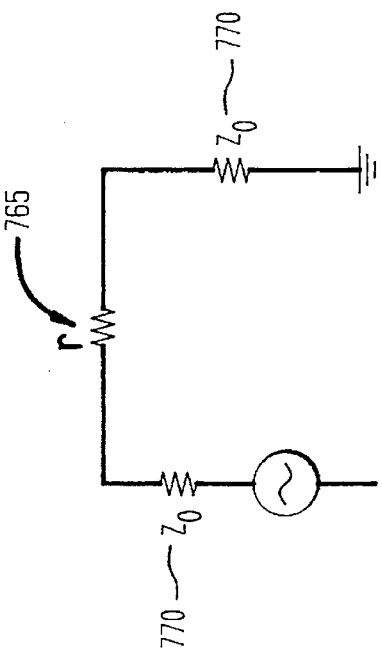
Figure 10B:
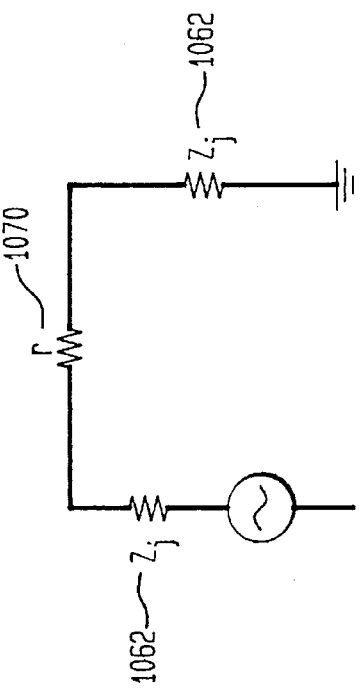

Similar to FIG. 7b, FIG. 10b shows a small signal model of the block diagram of FIG 10a. As the switches 705, 710 of FIG. 7b, the switch 1050 of FIG. 10a is represented by its small signal resistance r 1070. Since at any one time, only two of the four ports 926, 944, 970, 972 are connected together, in accordance with table 1, the filters associated with the connected ports are represented by $Z_j$ 1062.

The amplitude in dB of the loss $\alpha'$ of the switch 1050 (901 of FIG. 9a) can be calculated as $\alpha'$, where $\alpha'$ is given by equation (9), which is similar to equation (7).

$$\alpha' = 20\log(1 + e, \text{fra } g'_F/2 + ee) \, dB \tag{9}$$

where, similar to equation (8), $$g'_F = +e, \text{fra } 2r/Z_j + ee \tag{10}$$

Thus, equation (9) can be rewritten as:

$$\alpha' = 20\log\left(1 + \frac{2r}{2Z_j}\right) < 2\alpha_0 \, dB \tag{11}$$

where $\alpha_0$ is given by equation (7). The reason $\alpha'$ is less than $\alpha_0$ is because $Z_j$ is greater than $Z_0$.

Similar to the PIN diodes used to implement the switches 705, 710 of FIG. 7a, HSMP-3890 PIN diodes made by Hewlet Packard is used in one example to implement the switch 901 of FIG. 9a. The filters of the switch filter 900 of FIG. 9a are physically implemented using components having the same value as the filter 500 of FIG. 5. That is, the value of the components of the switch filter 900 are as follows:

| | | | | | | | |
|---|---|---|---|---|---|---|---|
| $L_1$ | = | $L_5$ | = | $L_6$ | = | $L_9$ | = 2.1 nH |
| $C_1$ | = | $C_5$ | = | $C_6$ | = | $C_9$ | = 18 pF |
| $L_2$ | = | $L_4$ | = | $L_7$ | = | $L_8$ | = 33 nH |
| $C_2$ | = | $C_4$ | = | $C_7$ | = | $C_8$ | = 1.2 pF |
| | | | | | | $L_3$ | = 1.5 nH |
| | | | | | | $C_3$ | = 27 pF |

Using HSMP-3890 PIN diodes and components having the above values, the switch filter 900 is physically implemented and its frequency response 1100 (FIG. 11) measured between the interconnected two ports. The other two ports which are not used during the insertion loss measurements, are terminated with a 50 Ω termination. This measured frequency response 1100 is shown in FIG. 11.

Figure 11:
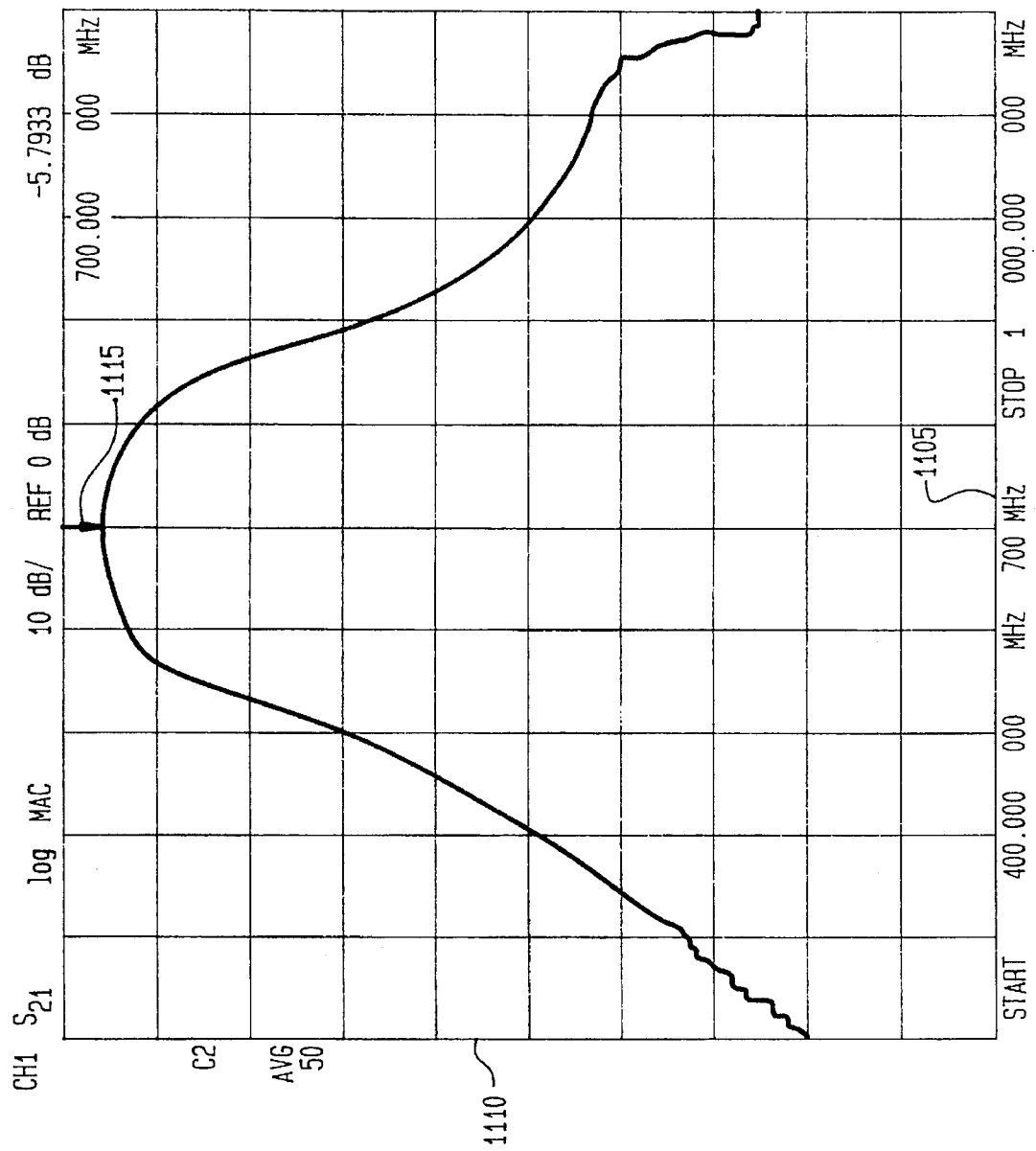

FIG. 11 is similar to FIG. 6, in that the horizontal axis 1105 represents frequency from 450 MHz to 950 MHz in increments of 50 MHz. The vertical axis 1110 represents magnitude of the output of the switch filter 600 of FIG. 9a in response to an input signal having a 0 dB amplitude from 450 MHz to 950 MHz. The vertical axis 1110 is in 10 dB increments starting from 0 db at the top and going down to −100 dB. The center frequency, where an arrow 1115 is pointing, is 700 MHz and the magnitude is −5.7933 dB. Excluding the switch 901, in a switched position, where any two of the four ports of the switch filter 900 of FIG. 9a are connected together, the switch filter 900 is identical to the filter 500 of FIG. 5. Therefore, comparing the frequency response 600 (FIG. 6) of the filter 500 of FIG. 5 and the frequency response 1100 (FIG. 11) of the filter 900 of FIG. 9a yields the loss due to the switch 901 of the switch filter 900. Hence, the loss due to the switch 901 is:

(−5.2399)−(−5.7933)=0.5534 dB which, as shown below, is more than 30% less than the 0.8 dB loss (0.4 dB loss per switch) associated with the filter 715 and two switches 705, 710 of FIG. 7a.

0.8−0.5534=0.2466

(0.2466)(100)/(0.8)=30.825%

That is, the switch filter 900 of FIG. 9a essentially provides the same functions as the filter 715 and the two switches 705, 710 of FIG. 7a but with approximately 30% less loss.

Figure 12:
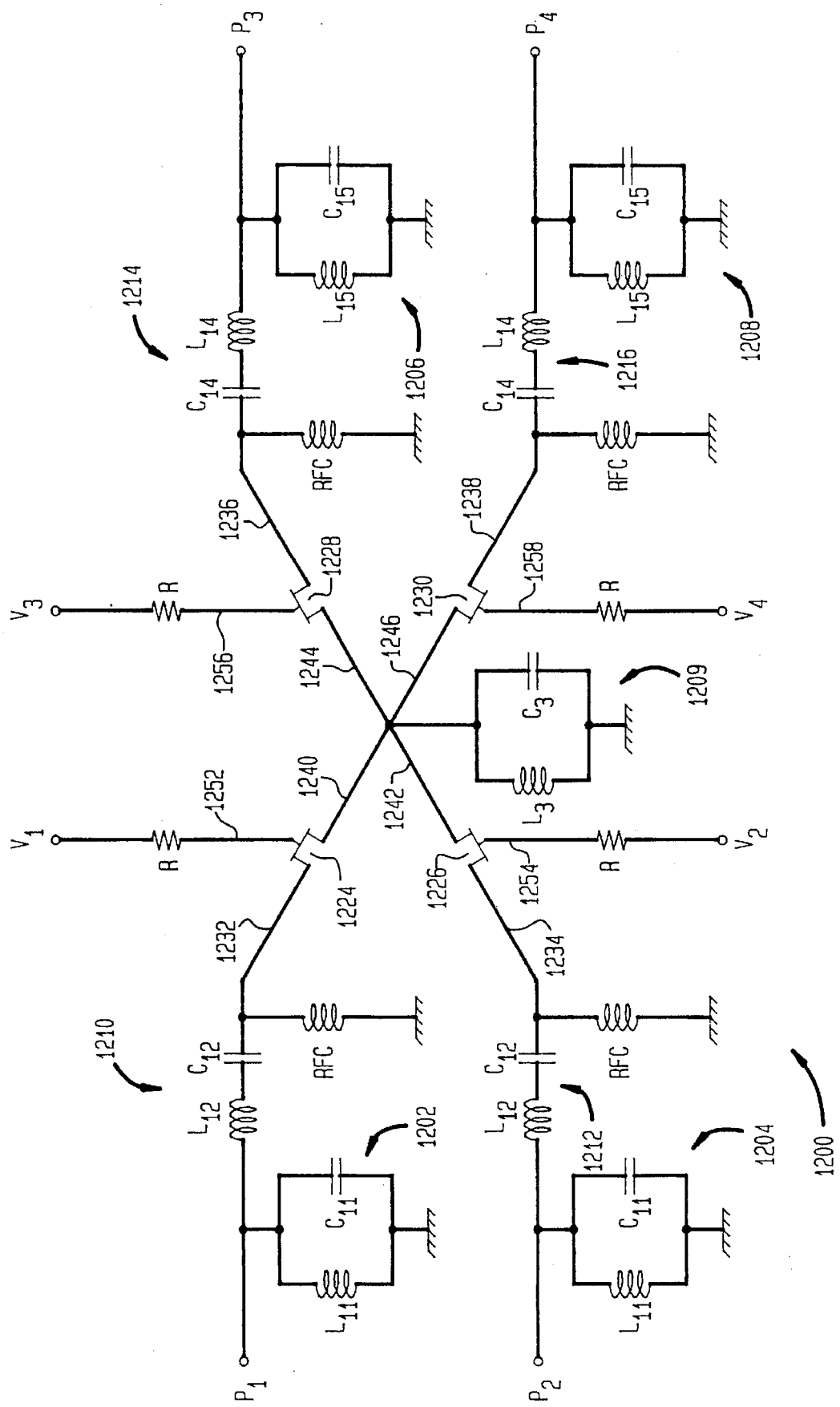
FIG. 12 depicts another embodiment of a switch filter according to the present invention using FET switches.

FIG. 12 shows another embodiment of a switch filter 1200 according to the present invention which is similar to the switch filter 900 of FIG. 9a. As in the switch filter 900, the switch filter 1200 has four ports $P_1$, $P_2$, $P_3$, $P_4$, parallel LC filters 1202, 1204, 1206, 1208, 1209 and series LC filters 1210, 1212, 1214, 1216. One terminal of the parallel LC filters 1202, 1204, 1206, 1208 and each series LC filter 1210, 1212, 1214, 1216 is respectively connected to each of the four ports $P_1$, $P_2$, $P_3$ and $P_4$. Illustratively, the capacitor and inductor of the parallel LC filters 1202, 1204 have the same value of $L_{11}$ and $C_{11}$, whereas the capacitor and inductor of the series LC filters 1210, 1212 have the same value of $L_{12}$ and $C_{12}$. Similarly, the capacitor and inductor of the parallel LC filters 1206, 1208 have the same value of $L_{15}$ and $C_{15}$, whereas the capacitor and inductor of the series LC filters 1214, 1216 have the same value of $L_{14}$ and $C_{14}$.

In the switch filter 1200, the diodes 1014, 1016, 1018, 1020 of FIG. 9a are replaced with field effect transistors (FETs) 1224, 1226, 1228, 1230. The drain 1232, 1234, 1236, 1238 of each FET 1224, 1226, 1228, 1230 is connected to its own inductor RFC which acts as an RF choke. In addition, the capacitors $C_{12}$ of the series LC filters 1210, 1212 are respectively connected to the drains 1232, 1234, while the capacitors $C_{14}$ of the series LC filters 1214, 1216 are respectively connected to the drains 1236, 1238.

The sources 1240, 1242, 1244, 1246 of the FETs 1224, 1226, 1228, 1230 are connected together. The interconnected sources 1240, 1242, 1244, 1246 are in turn connected to one terminal of the parallel LC filter 1209. Another terminal of each parallel LC filter 1202, 1204, 1206, 1208, 1209 and each inductor RFC is connected to ground.

Each gate 1252, 1254, 1256, 1258 of the FETs 1224, 1226, 1228, 1230 is respectively connected to its own control port $V_1$, $V_2$, $V_3$, $V_4$ through its own resistor R. The resistor R provide proper biasing to switch on the FETs 1224, 1226, 1228, 1230 when a control voltage −V is applied to the control ports $V_1$, $V_2$, $V_3$, $V_4$. The magnitude of the control voltage −V is more than the magnitude of the threshold voltage needed to switch on the FETs 1224, 1226, 1228, 1230. Therefore, for example, when a control voltage of zero volts (0 V) is applied to the control port $V_1$, then the FET 1224 conducts between its drain 1232 and its source 1240. The value of the biasing resistors R and the RF choke inductors RFC may be arbitrarily chosen so long as the biasing of the FETs 1224, 1226, 1228, 1230 are properly controlled. The ports $P_1$, $P_2$, $P_3$ and $P_4$ interconnect in response to the control signals or biasing voltages −V applied to the controls ports $V_1$, $V_2$, $V_3$, $V_4$ in accordance with table 2.

TABLE 2

| Connection | Control Port $V_1$ | Control Port $V_2$ | Control Port $V_3$ | Control Port $V_4$ |
|---|---|---|---|---|
| $P_2$ to $P_4$ | −V | 0 | −V | 0 |
| $P_2$ to $P_3$ | −V | 0 | 0 | −V |
| $P_1$ to $P_4$ | 0 | −V | −V | 0 |
| $P_1$ to $P_3$ | 0 | −V | 0 | −V |

That is, when a control voltage −V is applied to the control ports $V_1$ and $V_3$, while the control ports $V_2$ and $V_4$ are low (e.g., 0 volts), then the FETs 1226 and 1230 switch on and conduct, while the FETs 1224 and 1228 remain off. This connects port $P_1$ to port $P_3$.

Figure 13:
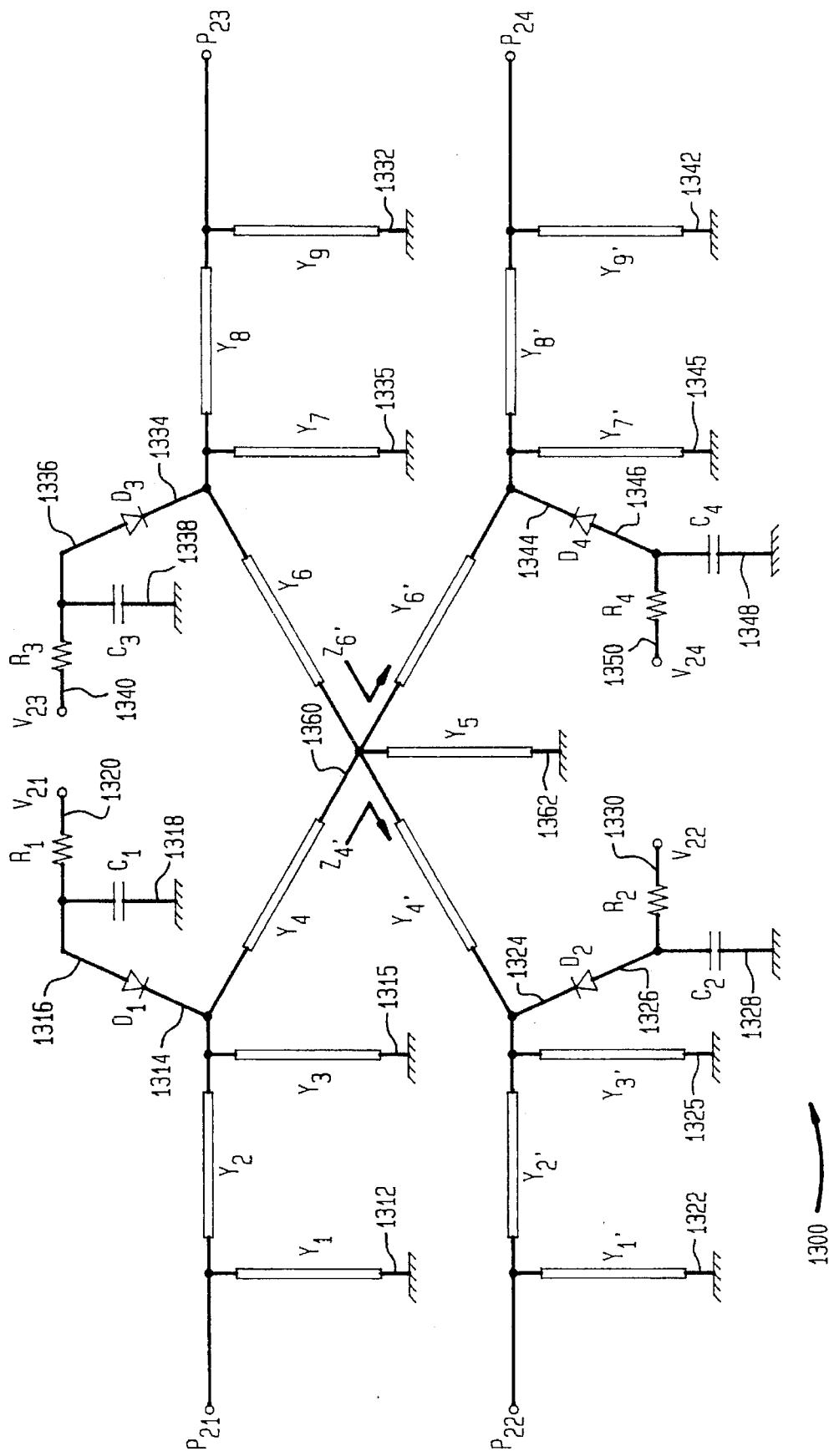
FIG. 13 depicts another embodiment of a switch filter according to the present invention using transmission lines.

FIG. 13 shows yet another embodiment of a switch filter 1300 according to the present invention wherein the LC filters of the prior embodiments (900 of FIG. 9a and 1200 of FIG. 12) are replaced with quarter-wave transmission line sections having an admittance Y. Similar to the prior embodiments, the switch filter 1300 comprises four ports $P_{21}$, $P_{22}$, $P_{23}$, $P_{24}$ and quarter-wave transmission line sections. Illustratively, nine quarter-wave transmission line sections are connected between any pair of ports $P_{21}$, $P_{22}$, $P_{23}$, $P_{24}$. Thus, the switch filter 1300 is a 2×2, i.e., a four port, 9 stage switch filter. A first quarter-wave transmission line section $Y_1$ has one terminal connected to port $P_{21}$, and another terminal 1312 connected to ground. $Y_1$ represents the admittance values of the first quarter-wave transmission line section. For simplicity, each quarter-wave transmission line section is hereinafter referred to by its admittance value. Similar to the $Y_1$ transmission line, all odd numbered quarter-wave transmission line sections have one terminal connected to signal paths between the ports $P_{21}$, $P_{22}$, $P_{23}$, $P_{24}$ and another terminal connected to ground. Even numbered quarter-wave transmission line sections are connected serially to form the signal paths between the ports $P_{21}$, $P_{22}$, $P_{23}$, $P_{24}$. For example, even numbered quarter-wave transmission line sections $Y_2$, $Y_4$, $Y_6$, $Y_8$ form the signal path between the ports $P_{21}$, $P_{23}$.

Port $P_{21}$ is also connected to one terminal of the second quarter-wave transmission line sections $Y_2$. A cathode 1314 of a diode $D_1$ is connected to the other terminal of $Y_2$ and to $Y_3$, $Y_4$ transmission lines. The other terminal 1315 of the $Y_3$ transmission line is grounded. The anode 1316 of the diode $D_1$ is connected to a capacitor $C_1$ and a resistor $R_1$. The other terminal 1318 of the capacitor $C_1$ is grounded while the other terminal 1320 of the resistor $R_1$ is a first control port $V_{21}$.

Similar to the port $P_{21}$, port $P_{22}$ is connected to $Y_1'$, $Y_2'$ transmission lines where the other end 1322 of $Y_1'$ is grounded. A cathode 1324 of a diode $D_2$ is connected to the other terminal of $Y_2'$ and to $Y_3'$, $Y_4'$ transmission lines. The other terminal 1325 of the $Y_3'$ transmission line is grounded. The anode 1326 of the diode $D_2$ is connected to a capacitor $C_2$ and a resistor $R_2$. The other terminal 1328 of the capacitor $C_2$ is grounded while the other terminal 1330 of the resistor $R_2$ is a second control port $V_{22}$.

Port $P_{23}$ is connected to one terminal of $Y_8$, $Y_9$ transmission lines. The other terminal 1332 of the $Y_9$ transmission line is grounded. A cathode 1334 of a diode $D_3$ is connected to the other terminal of $Y_8$ and to $Y_6$, $Y_7$ transmission lines. The other terminal 1335 of the $Y_7$ transmission line is grounded. The anode 1336 of the diode $D_3$ is connected to a capacitor $C_3$ and a resistor $R_3$. The other terminal 1338 of the capacitor $C_3$ is grounded while the other terminal 1340 of the resistor $R_3$ is a third control port $V_{23}$.

Similar to the port $P_{23}$, port $P_{24}$ is connected to $Y_8'$, $Y_9'$ transmission lines where the other end 1342 of $Y_9'$ is grounded. A cathode 1344 of a diode $D_4$ is connected to the other terminal of $Y_8'$ and to $Y_6'$, $Y_7'$ transmission lines. The other terminal 1345 of the $Y_7'$ transmission line is grounded. The anode 1346 of the diode $D_4$ is connected to a capacitor $C_4$ and a resistor $R_4$. The other terminal 1348 of the capacitor $C_4$ is grounded while the other terminal 1350 of the resistor $R_4$ is a fourth control port $V_{24}$.

The other terminal of each of $Y_4$, $Y_4'$, $Y_6$, $Y_6'$ transmission lines is connected to a terminal 1360 of $Y_5$ transmission line while the other terminal 1362 of $Y_5$ is grounded.

In the switch filter 1300, the diodes $D_1$, $D_2$, $D_3$, $D_4$ acts as switches similar to the diodes 1014, 1016, 1018, 1020 of FIG. 9a. Illustratively, the diodes $D_1$, $D_2$, $D_3$, $D_4$ are all the same type of diode and are PIN diodes. Similarly, the value of each of the admittances of the transmission lines $Y_1$, $Y_2$, $Y_3$, $Y_4$, $Y_6$, $Y_7$, $Y_8$, $Y_9$ is equal to the value of each of the admittances of the transmission lines $Y_1'$, $Y_2'$, $Y_3'$, $Y_4'$, $Y_6'$, $Y_7'$, $Y_8'$, $Y_9'$ respectively.

In addition, all the resistors $R_1$, $R_2$, $R_3$, $R_4$ have the same value. These resistors $R_1$, $R_2$, $R_3$, $R_4$ are used as RF chokes and may be replaced with inductors having a high inductance value which also act as RF chokes. Also, all the capacitors $C_1$, $C_2$, $C_3$, $C_4$ have the same value and are used to serially resonate with the bonding-wire stray inductance of the diodes $D_1$, $D_2$, $D_3$, $D_4$. This provides a better short to ground when the diodes conduct.

The diodes $D_1$, $D_2$, $D_3$, $D_4$ may be replaced with FET devices with biasing circuits that are properly adjusted. This is similar to the FETs 1224, 1226, 1228, 1230 and the biasing resistors R and RF chokes RFC of FIG. 12.

The diodes $D_1$, $D_2$, $D_3$, $D_4$ switch on and conduct when a control voltage V is applied to the control ports $V_{21}$, $V_{22}$, $V_{23}$, $V_{24}$. The magnitude of the control voltage V is high enough to drive the diodes $D_1$, $D_2$, $D_3$, $D_4$ into conduction. The ports $P_{21}$, $P_{22}$, $P_{23}$ and $P_{24}$ interconnect in response to the control signals or biasing voltages V applied to the controls ports $V_{21}$, $V_{22}$, $V_{23}$, $V_{24}$ in accordance with table 3.

TABLE 3

| Connection | Control Port $V_{21}$ | Control Port $V_{22}$ | Control Port $V_{23}$ | Control Port $V_{24}$ |
|---|---|---|---|---|
| $P_{21}$ to $P_{23}$ | 0 | V | 0 | V |
| $P_{21}$ to $P_{24}$ | 0 | V | V | 0 |
| $P_{22}$ to $P_{23}$ | V | 0 | 0 | V |
| $P_{22}$ to $P_{24}$ | V | 0 | V | 0 |

That is, when a control voltage V is applied to control ports $V_{22}$ and $V_{24}$, while the control ports $V_{21}$ and $V_{23}$ are low (e.g., 0 volts), then the diodes $D_2$ and $D_4$ switch on and conduct, while the diodes $D_1$ and $D_3$ remain off. This connects port $P_{21}$ to port $P_{23}$ due to the following reasons. When the control voltage V is applied to the control port $V_{22}$, then the diode $D_2$, conducts between its anode 1326 and its cathode 1324. This connects the cathode 1324, which is one terminal of $Y_4'$, to ground through the diode $D_2$ and capacitor $C_2$. The grounded quarter-wave transmission line section $Y_4'$ transforms the impedance $Z_4'$, looking into terminal 1360 toward $Y_4'$, into a high impedance. The high impedance $Z_4'$ prevents the power of the signal present at terminal 1360 to transfer through $Y_4'$.

Similarly, when the control voltage V is applied to the control port $V_{24}$, then the diode $D_4$ conducts and shorts one terminal of $Y_6'$ to ground. This terminal of $Y_6'$ is connected to the cathode 1344 and grounded through the conducting diode $D_4$ and the capacitor $C_4$. The grounded quarter-wave transmission line section $Y_6'$ transforms the impedance $Z_6'$, looking into terminal 1360 toward $Y_6'$, into a high impedance. The high impedance $Z_6'$ prevents the power of the signal present at terminal 1360 to transfer through $Y_6'$. Therefore, with the high impedance values of $Z_4'$ and $Z_6'$ blocking any power transfer of the signal present at terminal 1360 toward ports $P_{22}$ and $P_{24}$, a signal applied to port $P_{21}$ will flow toward port $P_{23}$ through terminal 1360 and vice versa. That is, port $P_{21}$ becomes connected to port $P_{23}$.

Illustratively, the present invention has been described up to this point using a broadband filter example which has a relatively low impedance as the Q value of the lumped elements are low. However, the present invention may be designed as a high Q narrowband filter. For example, if elements of high Q values are used (e.g., ceramic filter or stripline filter), then it is possible to select some filter models with high impedance conversion values and further reduce the loss.

The switch filter of the present invention has diodes connected in series, which are located within the switch filter dividing the filter into various half-filters. Because of impedance transformation, the transformed impedances (e.g., $Z_j$) of the half-filters connected to the switch are larger then the impedances $Z_0$ looking into the ports of the switch filter. This lowers the insertion loss of the switch filter.

Furthermore, connecting the cathode of the diodes together which are shunted to ground through a parallel LC circuit, and having individual resistors on the anode of each diode for receiving control signals provides flexible, simple and efficient operation.

The filter of the present is designed and manufactured together with the diode switches to form an integral switch filter. This reduces the size and cost of the switch filter. In addition, the filters of the present invention are not restricted to tuned narrow band filter. Instead, the filters of the inventive switch filter can be formed from random stages having random bands in accordance with filter theory and can be broad band filters.

The inventive switch filter provides a versatile low loss filter having many ports that can be connected in any desired combination in response to control signals applied to the switches or diodes of the switch filter. Such a versatile and a low loss filter operates more efficiently and requires less power. The reduced power consumption provides for a long battery life which is particularly important for mobile portable devices, such as cellular telephones and personal communicators.

In addition, the low insertion loss of the switch filter, which is at least 30% less than the insertion loss of a convention filter connected to switches, is particularly important in a noisy environment. The low insertion loss allows for acceptable performance of systems incorporating the inventive switch filter in noisy environment. Furthermore, the low insertion loss allows use of simpler external circuit connected to the switch filter. Thus, simple receivers and transmitters can be used, instead of complex low noise receivers with high sensitivity or low noise high power transmitters. Furthermore, antennas with lower gains can be used and the system using the switch filter can still perform adequately. In transceivers used in a communication system, for example, using less complex devices connected to the switch filter, such as receivers, transmitters and antennas, reduce the overall cost an size of the transceivers and provides for a simple and efficient operation.

The above-described embodiment of the present invention is intended to be illustrative only. Numerous alternative embodiments may be devised by those skilled in the art without departing from the spirit and scope of the following claims.

I claim:

1. A switch filter comprising:
   a plurality of filter stages connected between a plurality of ports of said switch filter, and
   a plurality of switches configured to selectively interconnect said plurality of filter stages, wherein said plurality of switches are connected internally to said plurality of filter stages and are configured to selectively interconnect said plurality of ports of said switch filter.

2. The switch filter of claim 1 wherein said plurality of switches are diodes having cathodes connected to each other, and wherein an anode of each of said diodes is connected to one of said plurality of filter stages.

3. The switch filter of claim 2 further comprising a parallel LC circuit connected to said cathodes of said diodes.

4. The switch filter of claim 2 further comprising a plurality of resistors, including one resistor connected to said anode of each of said diodes, wherein said diodes switch in response to control signals applied to said plurality of resistors.

5. The switch filter of claim 1 wherein each one of said plurality of filter stages comprises:
   a parallel LC circuit having a first terminal connected to one of said plurality of ports of said switch filter,
   a series LC circuit having a first terminal connected to said first terminal of said parallel LC circuit, said series LC circuit having a second terminal connected to one of said plurality of switches.

6. The switch filter of claim 1 wherein
   a first port of said plurality of ports is connected to a receiver,
   a second port of said plurality of ports is connected to a transmitter,
   a third port of said plurality of ports is connected to a first antenna, and
   a fourth port of said plurality of ports is connected to a second antenna, and wherein
   in response to control signals applied to said plurality of switches, said plurality of switches selectively connect said first antenna to one of said receiver and said transmitter, and selectively connect said second antenna to one of said receiver and said transmitter.

7. The switch filter of claim 1 wherein said plurality of switches are field effect transistors having sources connected to each other, and wherein a drain of each of said field effect transistors is connected to one of said plurality of filter stages.

8. The switch filter of claim 7 further comprising a plurality of RF choke, including one RF choke connected to said drain of each of said field effect transistors.

9. The switch filter of claim 7 further comprising a plurality of resistors, including one resistor connected to a gate of each of said field effect transistors, wherein said field effect transistors switch in response to control signals applied to said plurality of resistors.

10. The switch filter of claim 1 wherein each one of said plurality of filter stages comprises a quarter-wave transmission line section.

11. The switch filter of claim 10 wherein a set of said quarter-wave transmission line sections are connected in series along a signal path between a pair of said plurality of ports, and wherein each terminal of quarter-wave transmission line sections of said set is connected to a ground through a corresponding quarter-wave transmission line section.

12. The switch filter of claim 10 further comprising a plurality of resistors, and a plurality of capacitors, and wherein said plurality of switches are diodes, each one of said diodes having a cathode connected to one of said quarter-wave transmission line sections, and having an anode connected to a terminal of one of said plurality of resistors and to a terminal of one of said plurality of capacitors.

13. The switch filter of claim 12 wherein another terminal of said one resistor is a control port connected to receive controls signals for switcing said one diode, and wherein another terminal of said one capacitor is connected to ground.

14. The switch filter of claim 1, wherein the switches are frequency independent.

15. The switch filter of claim 1, wherein the filter stages are half filters.

16. A switch filter comprising:
   a plurality of ports,
   a plurality of switches, wherein each one of said plurality of switches has a first terminal connected together, and
   a plurality of filter stages, wherein a first terminal of each one of said plurality of filter stages is connected to one of said plurality of ports, and wherein a second terminal of each of said plurality of filter stages is connected to a second terminal of said plurality of switches,
   wherein said plurality of switches selectively interconnect said plurality of ports of said switch filter.

17. A switch filter comprising:
   a plurality of ports,
   a plurality of switches, wherein each one of said plurality of switches has a first terminal connected together, and
   a plurality of filter stages, wherein a first terminal of each one of said plurality of filter stages is connected to one of said plurality of ports, and wherein a second terminal of each of said plurality of filter stages is connected to a second terminal of said plurality of switches,
   wherein said plurality of switches are configured to selectively interconnect said plurality of filter stages in a manner to selectively connect said ports of said switch filter.

18. A switch filter for a communication system, comprising:
   a plurality of switches,
   a first half filter connected between a first port of said switch filter and a first terminal of a first switch of said plurality of switches, a second half filter connected between a second port of said switch filter and a first terminal of a second switch of said plurality of switches, a third half filter connected between a third port of said switch filter and a first terminal of a third switch of said plurality of switches, a fourth half filter connected between a fourth port of said switch filter and a first terminal of a fourth switch of said plurality of switches, wherein second terminals of said first, second, third and fourth switches are connected together.

19. A switch filter comprising:

a plurality of input and output ports, a first plurality of half-filters, including one first half-filter connected to each input port, a second plurality of half-filters, including one second half-filter connected to each output port, and a switch for selectively connecting one of said first half-filters to one of said second half-filters.

20. A transceiver comprising:

first and second antennas, a receiver, a transmitter, and a switch filter for selectively interconnecting said receiver and said transmitter to said first and second antennas, said switch filter comprising:

a first plurality of half-filters, including one first half-filter connected to said transmitter and one first half-filter connected to said receiver, a second plurality of half-filters, including one second half-filter connected to said first antenna and one second half-filter connected to said second antenna, and a switch for selectively connecting one of said first half-filters to one of said second half-filters.

* * * * *